United States Patent
Michael

(10) Patent No.: US 12,206,538 B2
(45) Date of Patent: Jan. 21, 2025

(54) TRANSMISSION DEVICE, TRANSMISSION METHOD, RECEPTION DEVICE, AND RECEPTION METHOD

(71) Applicant: Sony Group Corporation, Tokyo (JP)

(72) Inventor: Lachlan Bruce Michael, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 6 days.

(21) Appl. No.: 18/006,150

(22) PCT Filed: Jul. 16, 2021

(86) PCT No.: PCT/JP2021/026738
§ 371 (c)(1),
(2) Date: Jan. 20, 2023

(87) PCT Pub. No.: WO2022/024802
PCT Pub. Date: Feb. 3, 2022

(65) Prior Publication Data
US 2023/0318893 A1    Oct. 5, 2023

(30) Foreign Application Priority Data
Jul. 29, 2020    (JP) .................................. 2020-127898

(51) Int. Cl.
*H04L 27/26*    (2006.01)
(52) U.S. Cl.
CPC .................................. *H04L 27/261* (2013.01)
(58) Field of Classification Search
CPC .................................................... H04L 27/261
See application file for complete search history.

(56) References Cited

U.S. PATENT DOCUMENTS

2010/0118994 A1*  5/2010  Park ...................... H04H 20/31
                                                          375/260
2011/0103515 A1*  5/2011  Park ...................... H04L 27/02
                                                          375/301
(Continued)

FOREIGN PATENT DOCUMENTS

JP    2015-162848 A    9/2015
JP    2018-511188 A    4/2018
(Continued)

OTHER PUBLICATIONS

D. Kang, H. Park, S. I.Park, H. M. Kim and W. Oh, "Additional data transmission scheme using TxIDsignal for ATSC system," 2010 IEEE International Symposium onBroadband Multimedia Systems and Broadcasting (BMSB), Shanghai, China, 2010, (Year: 2010) pp. 1-3, doi: 10.1109/ISBMSB.2010.5463140.*
(Continued)

*Primary Examiner* — Jaison Joseph
(74) *Attorney, Agent, or Firm* — XSENSUS LLP

(57) ABSTRACT

A transmission device that generates a transmission identification signal indicating transmission identification information for identifying a transmission device that transmits an orthogonal frequency division multiplexing (OFDM) signal, and that injects a transmission identification signal at a lower level than an OFDM signal corresponding to data to be transmitted into all OFDM symbols of the OFDM signal. The reception device demodulates the OFDM signal after the injection of the transmission identification signal from the transmission device.

16 Claims, 26 Drawing Sheets

(56) References Cited

U.S. PATENT DOCUMENTS

| | | | | |
|---|---|---|---|---|
| 2017/0237591 | A1* | 8/2017 | Atungsiri | H04L 27/26136 375/260 |
| 2018/0359045 | A1* | 12/2018 | Park | H04J 13/10 |
| 2018/0375601 | A1* | 12/2018 | Park | H04L 27/2627 |
| 2019/0190689 | A1* | 6/2019 | Okada | H04L 7/0091 |
| 2019/0296951 | A1* | 9/2019 | Kwon | H04L 27/2607 |
| 2020/0076454 | A1* | 3/2020 | Oh | H04L 25/0212 |
| 2020/0153519 | A1* | 5/2020 | Park | H04W 52/322 |
| 2022/0045779 | A1* | 2/2022 | Park | H04J 13/16 |
| 2023/0318893 | A1* | 10/2023 | Michael | H04L 27/261 375/260 |

FOREIGN PATENT DOCUMENTS

| | | |
|---|---|---|
| JP | 2019-506810 A | 3/2019 |
| WO | 2010/079757 A1 | 7/2010 |

OTHER PUBLICATIONS

International Search Report and Written Opinion mailed on Aug. 31, 2021, received for PCT Application PCT/JP2021/026738, filed on Jul. 16, 2021, 11 pages including English Translation.

ATSC, "ATSC Standard:Physical Layer Protocol(A/322)", Advanced Television Systems Committee, Doc. A/322:2016, Sep. 7, 2016, pp. 1-258.

Ishizaki et al., "A Study on Information Embedding Scheme to Transmission Signal", The Institute of Electronics Information and Communication Engineers, IEICE Technical Report, SR2007-93, vol. 107, No. 519, Mar. 2008, pp. 51-58 (8 pages including English Abstract).

"ATSC Standard: Physical Layer Protocol", Jun. 6, 2017, pp. 244 to 248 3., On 06 months, 06 months, (A/322), Doc.A/322:2017.

Ishizaki , et al., "An information embedding system for radio transmission signals, technical research report", Mar. 2008, pp. 51-58, vol. 107, No. 519 , Incorporated Electronic Information Communication Engineers, Japan.

* cited by examiner

FIG. 18

| Tier 1 | | Tier 2 |
|---|---|---|
| $x^{13}$ | 0 | $t_{12}$ |
| $x^{12}$ | 0 | $t_{11}$ |
| $x^{11}$ | 0 | $t_{10}$ |
| $x^{10}$ | 0 | $t_9$ |
| $x^9$ | 0 | $t_8$ |
| $x^8$ | 0 | $t_7$ |
| $x^7$ | 0 | $t_6$ |
| $x^6$ | 0 | $t_5$ |
| $x^5$ | 0 | $t_4$ |
| $x^4$ | 0 | $t_3$ |
| $x^3$ | 0 | $t_2$ |
| $x^2$ | 0 | $t_1$ |
| $x$ | 1 | $t_0$ |

| Injection Level | REQUIRED CNR [dB] | | | | | | |
|---|---|---|---|---|---|---|---|
| | 5 | 10 | 15 | 20 | 25 | 30 | 35 |
| -45 | 0.00 | 0.00 | 0.00 | 0.01 | 0.04 | 0.14 | 0.46 |
| -44 | 0.00 | 0.00 | 0.01 | 0.02 | 0.06 | 0.18 | 0.58 |
| -43 | 0.00 | 0.00 | 0.01 | 0.02 | 0.07 | 0.22 | 0.75 |
| -42 | 0.00 | 0.00 | 0.01 | 0.03 | 0.09 | 0.28 | 0.97 |
| -41 | 0.00 | 0.00 | 0.01 | 0.03 | 0.11 | 0.36 | 1.26 |
| -40 | 0.00 | 0.00 | 0.01 | 0.04 | 0.14 | 0.46 | 1.65 |
| -39 | 0.00 | 0.01 | 0.02 | 0.06 | 0.18 | 0.58 | 2.20 |
| -38 | 0.00 | 0.01 | 0.02 | 0.07 | 0.22 | 0.75 | 3.02 |
| -37 | 0.00 | 0.01 | 0.03 | 0.09 | 0.28 | 0.97 | 4.33 |
| -36 | 0.00 | 0.01 | 0.03 | 0.11 | 0.36 | 1.26 | 6.87 |
| -35 | 0.00 | 0.01 | 0.04 | 0.14 | 0.46 | 1.65 | |
| -34 | 0.01 | 0.02 | 0.06 | 0.18 | 0.58 | 2.20 | |
| -33 | 0.01 | 0.02 | 0.07 | 0.22 | 0.75 | 3.02 | |
| -32 | 0.01 | 0.03 | 0.09 | 0.28 | 0.97 | 4.33 | |
| -31 | 0.01 | 0.03 | 0.11 | 0.36 | 1.26 | 6.87 | |
| -30 | 0.01 | 0.04 | 0.14 | 0.46 | 1.65 | | |
| -29 | 0.02 | 0.06 | 0.18 | 0.58 | 2.20 | | |
| -28 | 0.02 | 0.07 | 0.22 | 0.75 | 3.02 | | |
| -27 | 0.03 | 0.09 | 0.28 | 0.97 | 4.33 | | |
| -26 | 0.03 | 0.11 | 0.36 | 1.26 | 6.87 | | |
| -25 | 0.04 | 0.14 | 0.46 | 1.65 | | | |
| -24 | 0.06 | 0.18 | 0.58 | 2.20 | | | |
| -23 | 0.07 | 0.22 | 0.75 | 3.02 | | | |
| -22 | 0.09 | 0.28 | 0.97 | 4.33 | | | |
| -21 | 0.11 | 0.36 | 1.26 | 6.87 | | | |
| -20 | 0.14 | 0.46 | 1.65 | | | | |
| -19 | 0.18 | 0.58 | 2.20 | | | | |
| -18 | 0.22 | 0.75 | 3.02 | | | | |
| -17 | 0.28 | 0.97 | 4.33 | | | | |
| -16 | 0.36 | 1.26 | 6.87 | | | | |
| -15 | 0.46 | 1.65 | | | | | |
| -14 | 0.58 | 2.20 | | | | | |
| -13 | 0.75 | 3.02 | | | | | |
| -12 | 0.97 | 4.33 | | | | | |
| -11 | 1.26 | 6.87 | | | | | |

FIG. 23

|  | Tier 1 | Tier 2 |
|---|---|---|
| $x^{14}$ | 0 | $t_{14}$ |
| $x^{13}$ | 0 | $t_{13}$ |
| $x^{12}$ | 0 | $t_{12}$ |
| $x^{11}$ | 0 | $t_{11}$ |
| $x^{10}$ | 0 | $t_{10}$ |
| $x^9$ | 0 | $t_9$ |
| $x^8$ | 0 | $t_8$ |
| $x^7$ | 0 | $t_7$ |
| $x^6$ | 0 | $t_6$ |
| $x^5$ | 0 | $t_5$ |
| $x^4$ | 0 | $t_4$ |
| $x^3$ | 0 | $t_3$ |
| $x^2$ | 0 | $t_2$ |
| $x^1$ | 1 | $t_1$ |

TRANSMISSION DEVICE, TRANSMISSION METHOD, RECEPTION DEVICE, AND RECEPTION METHOD

CROSS-REFERENCE TO RELATED APPLICATIONS

The present application is based on PCT filing PCT/JP2021/026738, filed Jul. 16, 2021, which claims priority to JP 2020-127898, filed Jul. 29, 2020, the entire contents of each are incorporated herein by reference.

TECHNICAL FIELD

The present technology relates to a transmission device, a transmission method, a reception device, and a reception method, and particularly relates to, for example, a transmission device, a transmission method, a reception device, and a reception method capable of improving reception performance.

BACKGROUND ART

In recent digital broadcasting, for example, in ISDB-T, ATSC 3.0, or the like, a combination of single frequency network (SFN) and orthogonal frequency division multiplexing (OFDM) is adopted for effective use of frequency (see, for example, NPL 1).

Furthermore, there has been proposed a digital broadcast transmission system that reduces interference between adjacent channels in a case where transmission is performed without guard bands between adjacent channels by arranging pilot signals in a specific manner (see, for example, Patent Document 1).

CITATION LIST

Patent Document

Patent Document 1: Japanese Patent Application Laid-Open No. 2015-162848

Non-Patent Document

Non Patent Document 1: ATSC Standard: Physical Layer Protocol(A/322), Doc. A/322:2016, 7 Sep. 2016

SUMMARY OF THE INVENTION

Problems to be Solved by the Invention

In a reception device that receives an OFDM signal, transmission path (delay) characteristics (delay profile) are estimated (generated) for equalization of the OFDM signal.

Therefore, if the transmission path characteristics are erroneously estimated, the OFDM signal cannot be appropriately equalized, and the reception performance of the reception device is deteriorated.

The present technology has been made in view of such a situation, and is intended to improve reception performance.

Solutions to Problems

A transmission device of the present technology is a transmission device including: a transmission identification signal generation unit that generates a transmission identification signal indicating transmission identification information for identifying a transmission device that transmits an orthogonal frequency division multiplexing (OFDM) signal; and an injection unit that injects the transmission identification signal at a lower level than the OFDM signal corresponding to data to be transmitted into all OFDM symbols of the OFDM signal.

A transmission method of the present technology is a transmission method including: generating a transmission identification signal indicating transmission identification information for identifying a transmission device that transmits an orthogonal frequency division multiplexing (OFDM) signal; and injecting the transmission identification signal at a lower level than the OFDM signal corresponding to data to be transmitted into all OFDM symbols of the OFDM signal.

In the transmission device and the transmission method of the present technology, a transmission identification signal indicating transmission identification information for identifying a transmission device that transmits an orthogonal frequency division multiplexing (OFDM) signal is generated, and the transmission identification signal at a lower level than the OFDM signal corresponding to data to be transmitted is injected into all OFDM symbols of the OFDM signal.

A reception device of the present technology is a reception device including a demodulation unit that demodulates an orthogonal frequency division multiplexing (OFDM) signal after injection of a transmission identification signal, the OFDM signal being obtained by: generating the transmission identification signal indicating transmission identification information for identifying a transmission device that transmits the OFDM signal; and injecting the transmission identification signal at a lower level than the OFDM signal corresponding to data to be transmitted into all OFDM symbols of the OFDM signal.

A reception method of the present technology is a reception method including demodulating an orthogonal frequency division multiplexing (OFDM) signal after injection of a transmission identification signal, the OFDM signal being obtained by: generating the transmission identification signal indicating transmission identification information for identifying a transmission device that transmits the OFDM signal; and injecting the transmission identification signal at a lower level than the OFDM signal corresponding to data to be transmitted into all OFDM symbols of the OFDM signal.

In the reception device and the reception method of the present technology, an orthogonal frequency division multiplexing (OFDM) signal after injection of a transmission identification signal is demodulated, the OFDM signal being obtained by: generating the transmission identification signal indicating transmission identification information for identifying a transmission device that transmits the OFDM signal; and injecting the transmission identification signal at a lower level than the OFDM signal corresponding to data to be transmitted into all OFDM symbols of the OFDM signal.

Note that the transmission device and the reception device may be independent devices or may be internal blocks constituting one device.

Furthermore, the transmission device and the reception device can be implemented by causing a computer to execute a program. The program can be provided by being transmitted via a transmission medium or by being recorded on a recording medium.

BRIEF DESCRIPTION OF DRAWINGS

FIG. 18 is a diagram showing initial values set in a first-stage register group 121 and a second-stage register group 122.

FIG. 19 is a diagram for explaining a full injection method.

FIG. 20 is a diagram illustrating a simulation result of signal degradation due to interference caused by injection of a transmission identification signal.

FIG. 23 is a diagram showing initial values set in a first-stage register group 221 and a second-stage register group 222.

MODE FOR CARRYING OUT THE INVENTION

<Embodiment of Transmission System to which Present Technology is Applied>

Figure 1:
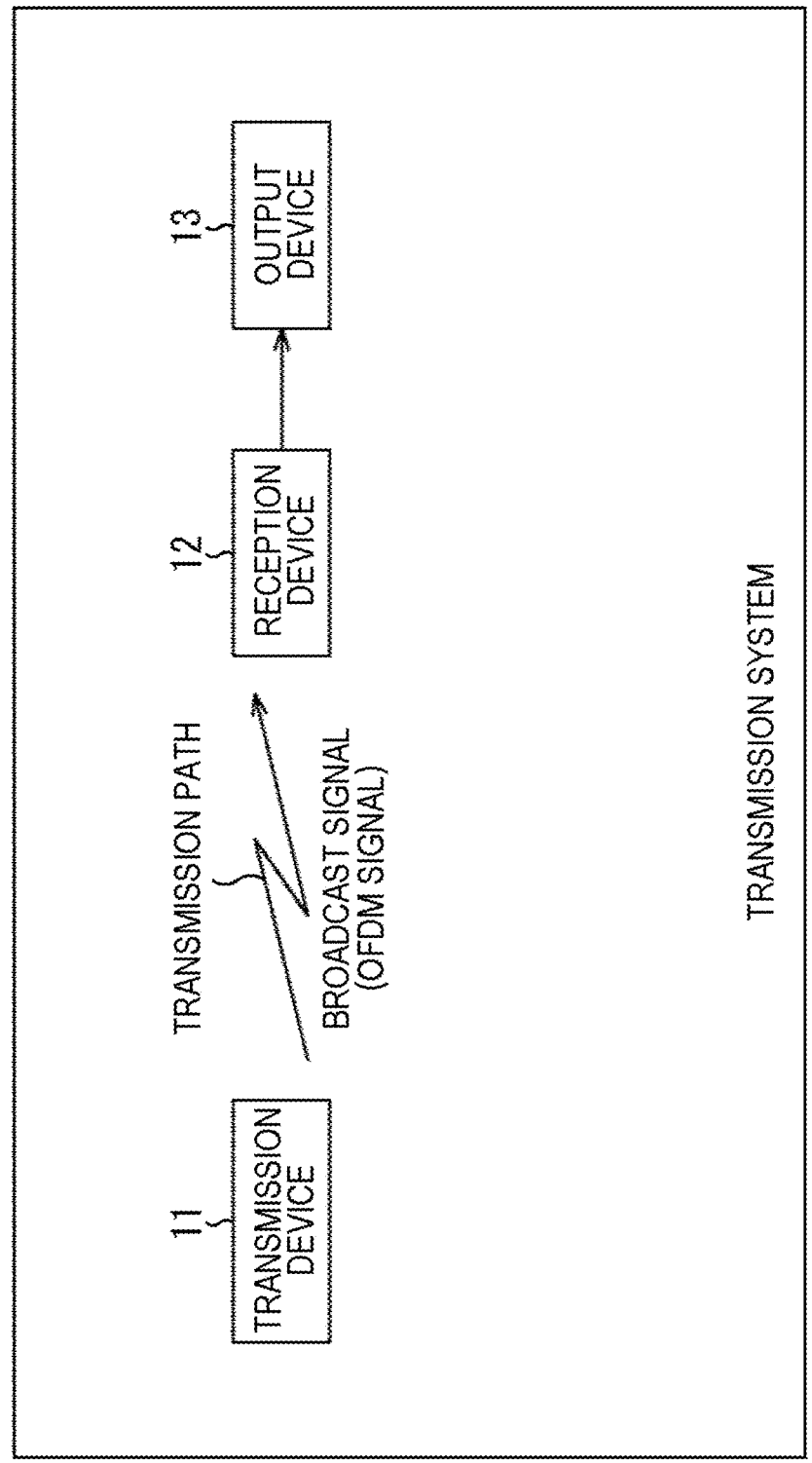
FIG. 1 is a block diagram illustrating a configuration example of an embodiment of a transmission system to which the present technology is applied.

FIG. 1 is a block diagram illustrating a configuration example of an embodiment of a transmission system to which the present technology is applied.

In FIG. 1, the transmission system includes a transmission device 11, a reception device 12, and an output device 13.

The transmission device 11 can perform, for example, transmission (broadcasting) of a television broadcast program or the like by a combination of SFN and OFDM. For example, the transmission device 11 performs transmission processing necessary for data to be transmitted with a content of a program such as image data, audio data, or the like as the data to be transmitted. The transmission device 11 transmits an OFDM signal as a broadcast signal obtained by performing transmission processing on the data to be transmitted via a transmission path such as a satellite line, a ground wave, a cable (wired line), or the like, for example.

The reception device 12 receives the OFDM signal as the broadcast signal transmitted from the transmission device 11 via the transmission path, restores the content of the program included in the broadcast signal, and supplies the content to the output device 13.

The output device 13 includes a display that displays an image or a speaker that outputs audio (sound), and displays an image or outputs audio as content or the like from the reception device 12.

Note that a plurality of the transmission device 11, the reception device 12, and both the transmission device 11 and the reception device 12 can be provided. In a case where a plurality of transmission devices 11 is provided, SFN can be adopted.

<Configuration Example of Transmission Device 11>

Figure 2:
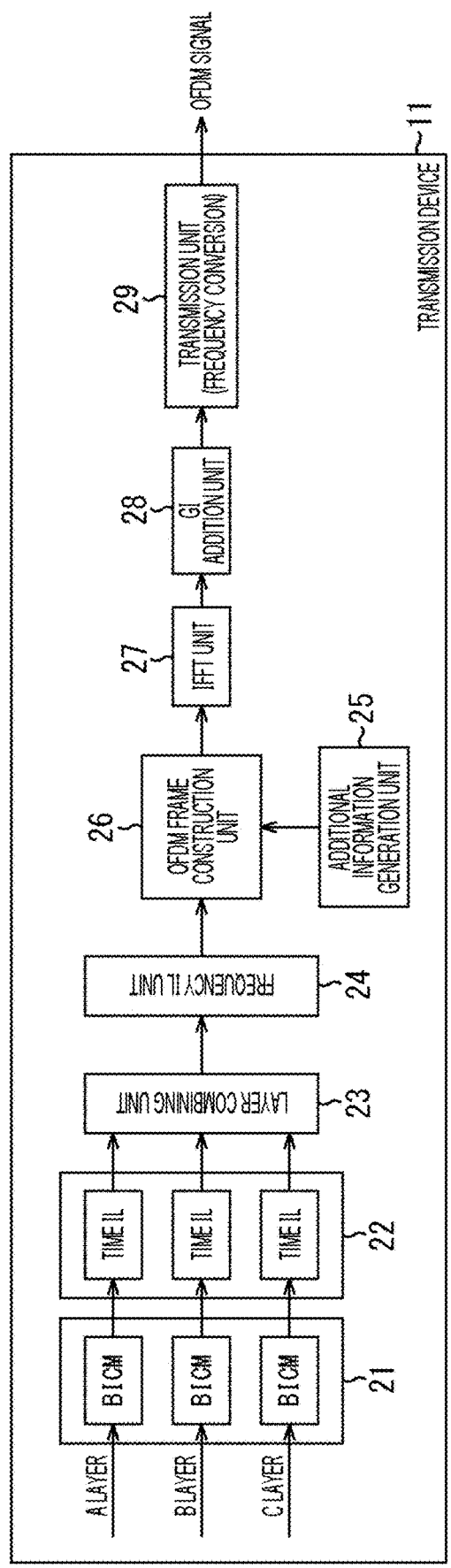
FIG. 2 is a block diagram illustrating a configuration example of a transmission device 11.

FIG. 2 is a block diagram illustrating a configuration example of the transmission device 11 in FIG. 1.

The transmission device 11 is, for example, a transmission device using ISDB-T, and can perform hierarchical transmission (hereinafter, also referred to as frequency division hierarchical transmission) in which a transmission band is divided into layers in a frequency direction. In ISDB-T, hierarchical transmission of three layers of A layer, B layer, and C layer at the maximum can be performed.

Note that, in current terrestrial digital broadcasting in Japan, hierarchical transmission is performed in which one channel including 13 segments is hierarchically divided into two layers of an A layer including one segment and a B layer including 12 segments. In the A layer, so-called 1seg broadcasting is performed, and in the B layer, so-called 2K broadcasting is performed.

In FIG. 2, the transmission device 11 includes a bit interleaved and coded modulation (BICM) unit 21, a time interleave (IL) unit 22, a layer combining unit 23, a frequency IL unit 24, an additional information generation unit 25, an OFDM frame construction unit 26, an inverse fast Fourier transform (IFFT) unit 27, a guard interval (GI) addition unit 28, and a transmission unit 29.

In the transmission device 11, data to be transmitted originally desired to be transmitted in the A layer, the B layer, and the C layer, for example, data (data of the A layer, data of the B layer, and data of the C layer) of contents of programs to be broadcast in the A layer, the B layer, and the C layer is supplied to the BICM unit 21.

The BICM unit 21 performs forward error correction (FEC) encoding processing such as low density parity check (LDPC) encoding or the like, mapping to (IQ) constellation, and the like on the data of the A layer, the data of the B layer, and the data of the C layer, and supplies the resulting transmission symbols (positions on the constellation) of the A layer to the C layer to the time IL unit 22.

The time IL unit 22 performs time interleaving for the transmission symbols of the A layer to the C layer from the BICM unit 21, and supplies the transmission symbols after the time interleaving to the layer combining unit 23.

The layer combining unit 23 performs layer combination of the transmission symbols of the A layer to the C layer from the time IL unit 22, and supplies the transmission symbols after the layer combination to the frequency IL unit 24.

The frequency IL unit 24 performs frequency interleaving on the transmission symbols from the layer combining unit 23 and supplies the transmission symbols after the frequency interleaving to the OFDM frame construction unit 26.

The additional information generation unit 25 generates additional information added in the physical layer such as a pilot signal, a transmission and multiplexing configuration and control (TMCC) signal of ISDB-T, an auxiliary channel (AC) signal, or the like, and supplies the additional information to the OFDM frame construction unit 26.

The OFDM frame construction unit 26 constructs an OFDM frame by adding (inserting) the transmission symbol of the additional information such as a pilot signal or the like from the additional information generation unit 25 to the transmission symbols from the frequency IL unit 24, and supplies the OFDM frame to the IFFT unit 27.

The IFFT unit 27 uses the OFDM frame supplied from the OFDM frame construction unit 26 as a signal in the frequency domain, performs IFFT on the OFDM frame with a predetermined FFT size, converts the OFDM frame into an OFDM frame in the time domain, and supplies the OFDM frame to the GI addition unit 28.

In the transmission symbols constituting the OFDM frame, an arrangement of transmission symbols corresponding to the FFT size for which IFFT is performed is called an OFDM symbol.

The GI addition unit 28 adds a GI having a length of a predetermined ratio of the symbol length of the OFDM symbol to each OFDM symbol constituting the OFDM frame in the time domain from the IFFT unit 27 to generate an OFDM signal as a broadcast signal, and supplies the OFDM signal to the transmission unit 29.

The transmission unit 29 performs frequency conversion on the broadcast signal from the GI addition unit 28 and transmits an OFDM signal as a broadcast signal after the frequency conversion.

<Configuration Example of Reception Device 12>

Figure 3:
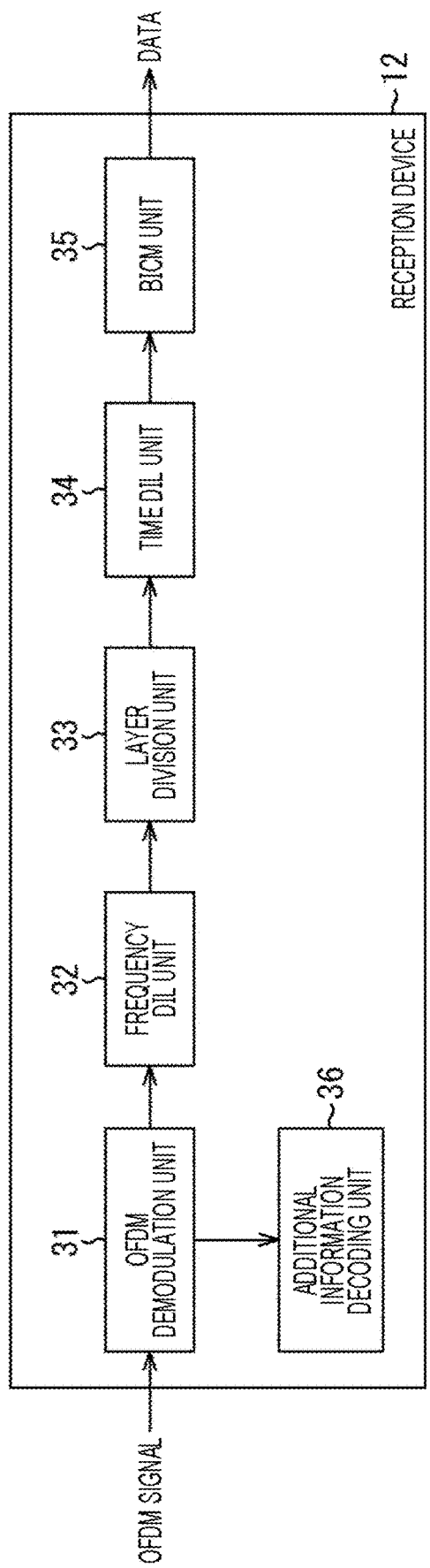
FIG. 3 is a block diagram illustrating a configuration example of a reception device 12.

FIG. 3 is a block diagram illustrating a configuration example of the reception device 12 in FIG. 1.

The reception device 12 is, for example, a reception device using ISDB-T, and can receive broadcast by frequency division hierarchical transmission.

In FIG. 3, the reception device 12 includes an OFDM demodulation unit 31, a frequency deinterleave (DIL) unit 32, a layer division unit 33, a time DIL unit 34, a BICM unit 35, and an additional information decoding unit 36.

The OFDM demodulation unit 31 receives the OFDM signal transmitted from the transmission device 11. The OFDM demodulation unit 31 demodulates the OFDM signal and supplies the OFDM signal (OFDM symbol) obtained by the demodulation to the frequency DIL unit 32.

The frequency DIL unit 32 performs frequency deinterleaving on the OFDM signal from the OFDM demodulation unit 31, and supplies the OFDM signal after the frequency deinterleaving to the layer division unit 33.

The layer division unit 33 performs layer division on the OFDM signal from the frequency DIL unit 32, and supplies the OFDM signal of a predetermined layer of the A layer to the C layer to the time DIL unit 34.

The time DIL unit 34 performs time deinterleaving on the OFDM signal from the layer division unit 33, and supplies the OFDM signal after time deinterleaving to the BICM unit 35.

The BICM unit 35 performs FEC decoding processing or the like such as demapping of an OFDM signal, decoding of an LDPC code, or the like, and outputs data obtained as a result to the outside.

The additional information decoding unit 36 decodes the additional information, for example, the TMCC signal from the signal in the middle of demodulation of the OFDM signal of the OFDM demodulation unit 31. The TMCC signal includes, for example, information such as a modulation method or the like, and is supplied to a necessary block of the reception device 12.

<Configuration Example of OFDM Demodulation Unit 31>

Figure 4:
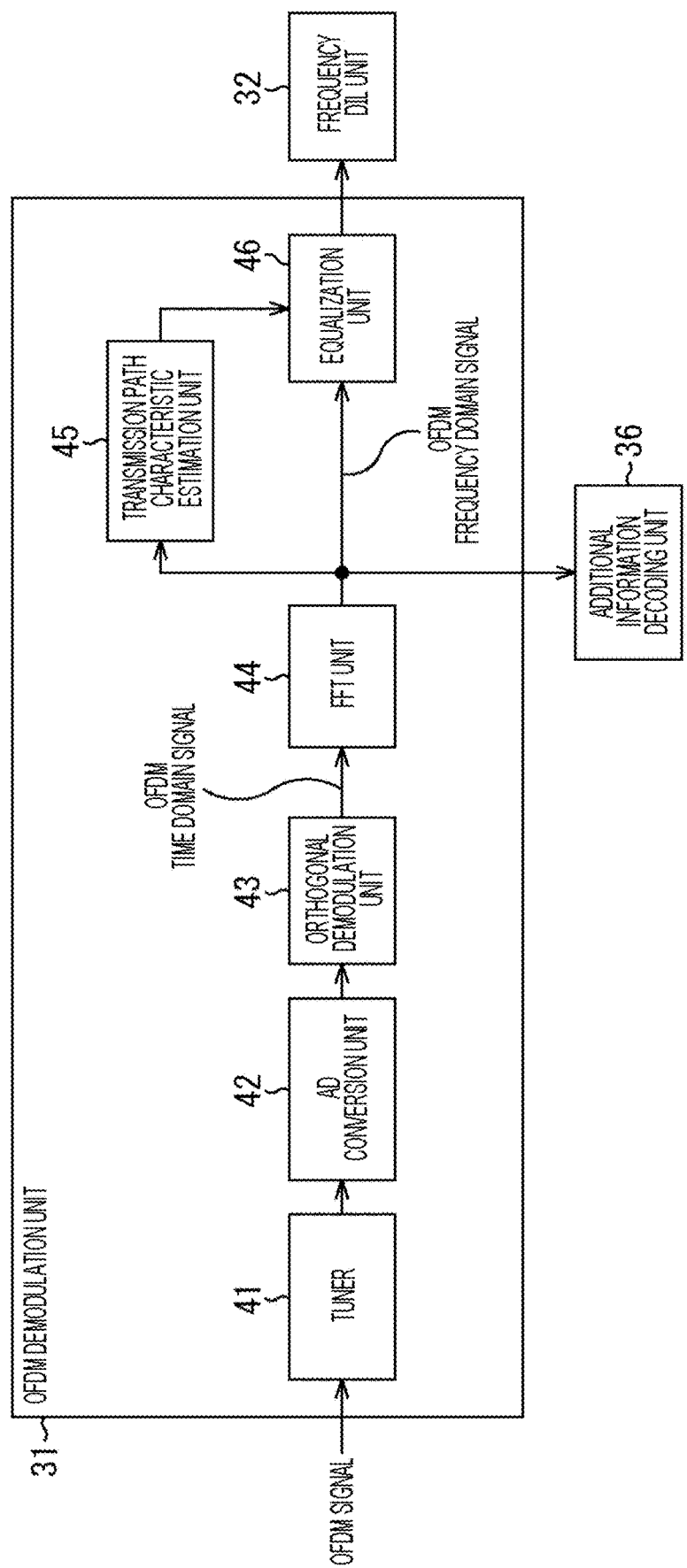
FIG. 4 is a block diagram illustrating a configuration example of an OFDM demodulation unit 31.

FIG. 4 is a block diagram illustrating a configuration example of the OFDM demodulation unit 31 in FIG. 3.

In FIG. 4, the OFDM demodulation unit 31 includes a tuner 41, an analog/digital (AD) conversion unit 42, an orthogonal demodulation unit 43, an FFT unit 44, a transmission path characteristic estimation unit 45, and an equalization unit 46.

The tuner 41 selects an OFDM signal as a broadcast signal of a predetermined channel, and frequency-converts the OFDM signal into an intermediate frequency (IF) signal. The tuner 41 supplies the IF signal to the AD conversion unit 42.

The AD conversion unit 42 performs AD conversion on the IF signal from the tuner 41, and supplies an IF signal of a digital signal obtained as a result to the orthogonal demodulation unit 43.

The orthogonal demodulation unit 43 orthogonally demodulates the IF signal from the AD conversion unit 42 using a carrier of a predetermined frequency (carrier frequency), and outputs a baseband OFDM signal obtained as a result.

Here, the OFDM signal output from the orthogonal demodulation unit 43 is a signal in the time domain before the FFT operation is performed (immediately after the transmission device 11 performs the IFFT operation on the transmission symbol on the IQ constellation), and is hereinafter also referred to as an OFDM time domain signal.

The OFDM time domain signal is a complex signal represented by a complex number including a real axis component (in phase (I) component) and an imaginary axis component (quadrature phase (Q) component).

The OFDM time domain signal is supplied from the orthogonal demodulation unit 43 to the FFT unit 44.

The FFT unit 44 extracts (sample values of) the OFDM time domain signal in the FFT interval of a predetermined FFT size from the OFDM time domain signal from the orthogonal demodulation unit 43, and performs an FFT operation. By the FFT operation of the OFDM time domain signal, data transmitted on a subcarrier, that is, an OFDM signal representing a transmission symbol on a constellation is obtained.

Here, the OFDM signal obtained by the FFT operation of the OFDM time domain signal is a signal in the frequency domain, and is hereinafter also referred to as an OFDM frequency domain signal.

The FFT unit 44 supplies the OFDM frequency domain signal obtained by the FFT operation to the transmission path characteristic estimation unit 45 and the equalization unit 46.

The transmission path characteristic estimation unit 45 estimates the transmission path characteristics of the position in the frequency direction and the time direction of each transmission symbol of the OFDM signal by using the pilot signals appropriately inserted into the OFDM frequency domain signal from the FFT unit 44. Then, the transmission path characteristic estimation unit 45 supplies (the estimated values of) the transmission path characteristics to the equalization unit 46.

The equalization unit 46 corrects the distortion of the amplitude and the phase received by each transmission symbol of the OFDM signal on the transmission path by equalizing the OFDM frequency domain signal from the FFT unit 44 by zero-forcing, for example, using (the estimated values of) the transmission path characteristics from the transmission path characteristic estimation unit 45. The equalization unit 46 supplies the OFDM frequency domain signal after equalization to the frequency DIL unit 32.

<OFDM Symbol>

Figure 5:
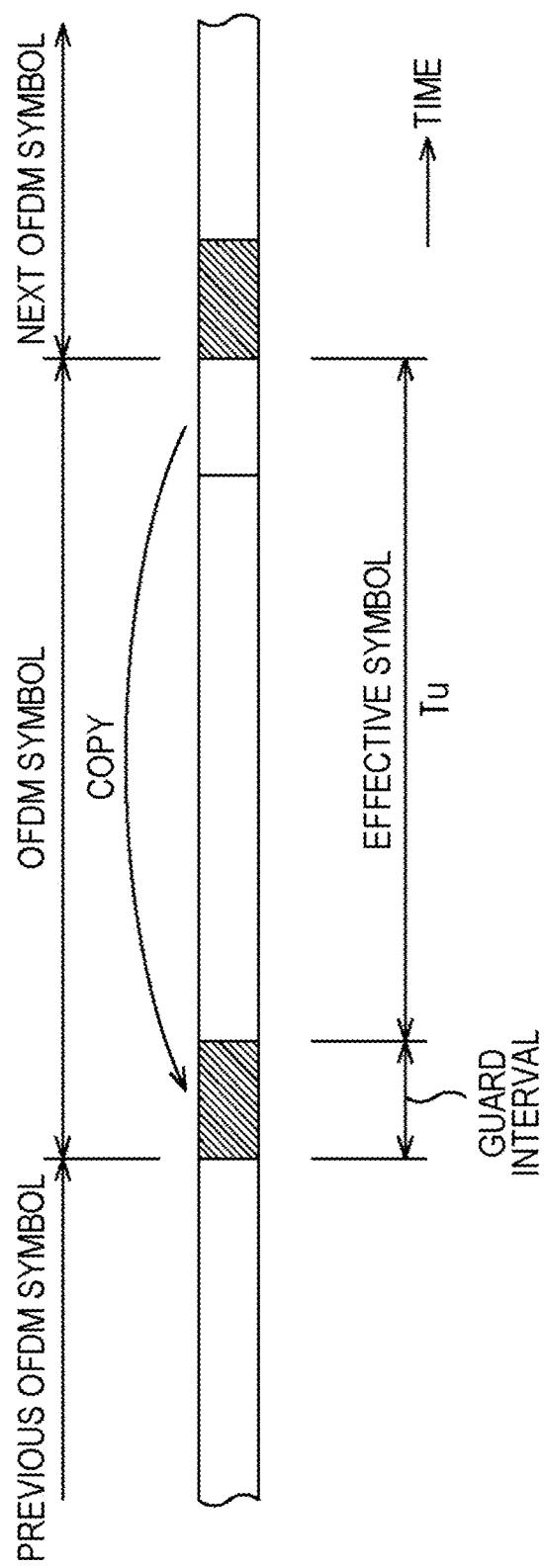
FIG. 5 is a diagram illustrating OFDM symbols.

FIG. 5 is a diagram illustrating OFDM symbols.

In OFDM, a large number of orthogonal subcarriers are provided in a transmission band, and digital modulation such as phase shift keying (PSK), quadrature amplitude modulation (QAM), or the like is performed to allocate data to the amplitude and phase of each subcarrier.

In OFDM, modulation can be performed by IFFT operation that performs inverse Fourier transform. Furthermore, demodulation of the OFDM signal obtained as a result of the modulation can be performed by FFT operation that performs Fourier transform.

Furthermore, in OFDM, by providing a signal interval called GI, resistance to multipath can be improved. Moreover, in OFDM, (the transmission symbol of) the pilot signal, which is a known signal (a signal known on the reception device 12 side), is discretely inserted in the time direction and the frequency direction, and in the reception device, the pilot signal is used for synchronization and estimation of transmission path characteristics.

In OFDM, data is transmitted in units called OFDM symbols.

The OFDM symbol includes an effective symbol that is a transmission symbol in a signal period in which IFFT is performed at the time of modulation, and a GI in which a waveform of a part of the latter half of the effective symbol is copied as it is to the head of the effective symbol.

Assuming that the length of the effective symbol of the OFDM symbol, that is, the effective symbol length that is the length not including the GI is Tu [sec], and the interval between the OFDM subcarriers is Fc [Hz], the relationship of the expression Fc=1/Tu is established.

In OFDM, as illustrated in FIG. 5, the GI is provided at the head of the OFDM symbol, thereby improving the resistance to multipath.

In terrestrial digital broadcasting employing OFDM, transmission is performed in units of frames (hereinafter, also referred to as OFDM frames) constituted by a plurality of OFDM symbols.

For example, in ISDB-T, one OFDM frame is constituted by 204 OFDM symbols, and positions where pilot signals are inserted are determined in advance in units of the OFDM frame.

In OFDM, at the time of transmission, the amplitude and phase of a subcarrier of an OFDM signal obtained by performing OFDM of data are affected differently for each subcarrier due to multipath or the like.

Therefore, the reception device 12 equalizes (performs distortion correction) the OFDM signal received from the transmission device 11 such that the amplitude and phase of the subcarrier of the OFDM signal received from the transmission device 11 are equal to the amplitude and phase of the subcarrier of the OFDM signal transmitted by the transmission device 11.

That is, in the OFDM, (the transmission symbol of) the known pilot signal whose amplitude and phase are determined in advance is discretely inserted into the transmission symbols constituting the OFDM symbol in the transmission device 11. Then, in the reception device 12, the transmission path characteristics are estimated on the basis of the amplitude and the phase of the pilot signal, and the OFDM signal is equalized using the transmission path characteristics.

Figure 6:
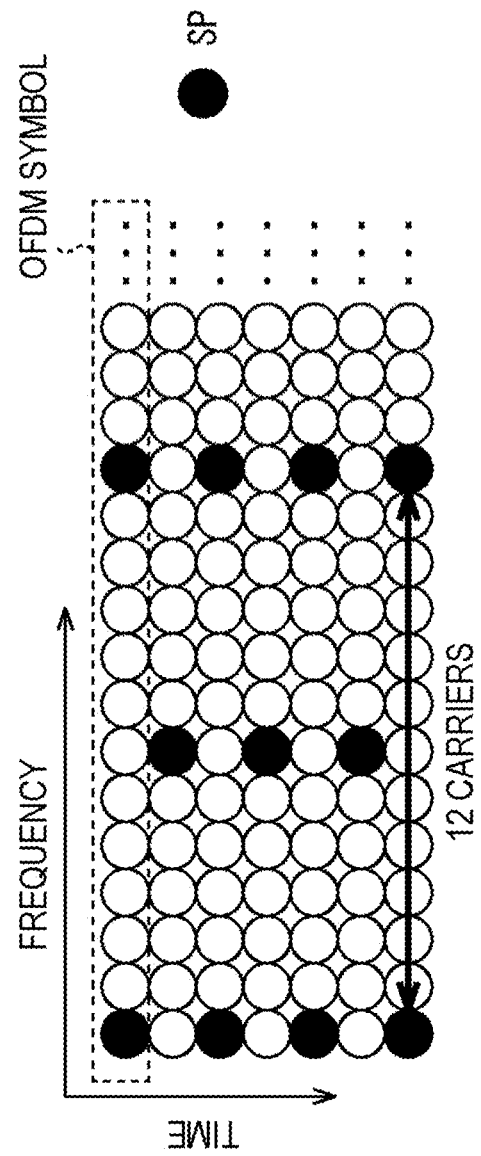
FIG. 6 is a diagram illustrating an example of arrangement of (transmission symbols of) pilot signals in an OFDM symbol.

FIG. 6 is a diagram illustrating an example of the arrangement of (the transmission symbols of) the pilot signals in the OFDM symbol.

In FIG. 6, the horizontal axis represents frequency, and the vertical axis represents time.

In FIG. 6, circles represent subcarriers of the OFDM signal or transmission symbols constituting the OFDM symbol.

Furthermore, in FIG. 6, black circles indicate pilot symbols which are transmission symbols of pilot signals (scattered pilot (SP)).

The same applies to the similar drawings to be described later.

In FIG. 6, a set of transmission symbols in one row arranged horizontally is one OFDM symbol.

The pilot symbols are arranged at a plurality of predetermined positions of the OFDM signal.

Now, assuming that the deviation of the arrangement positions of the pilot symbols in the frequency direction in two adjacent OFDM symbols is represented as Dx and the arrangement interval of the pilot symbols arranged at the same frequency (same column) in the time direction is represented as Dy, the arrangement pattern of the pilot symbols is a pattern of Dx=6 and Dy=2 in FIG. 6.

That is, in FIG. 6, the pilot symbols are arranged every two OFDM symbols in the time direction, and are arranged every 12 subcarriers in the frequency direction.

In the reception device 12, the transmission path characteristics of the positions of the pilot symbols (positions in frequency direction and positions in time direction) can be estimated using the pilot symbols and the known pilot signals (the true values of the pilot signals).

The transmission path characteristics of the positions of the transmission symbols (hereinafter, also referred to as data symbols) other than the pilot symbols can be estimated by performing interpolation in the time direction or both interpolation in the time direction and interpolation in the frequency direction using the transmission path characteristics of the positions of the pilot symbols.

Hereinafter, interpolation in the time direction is also referred to as time interpolation, and interpolation in the frequency direction is also referred to as frequency interpolation.

Figure 7:
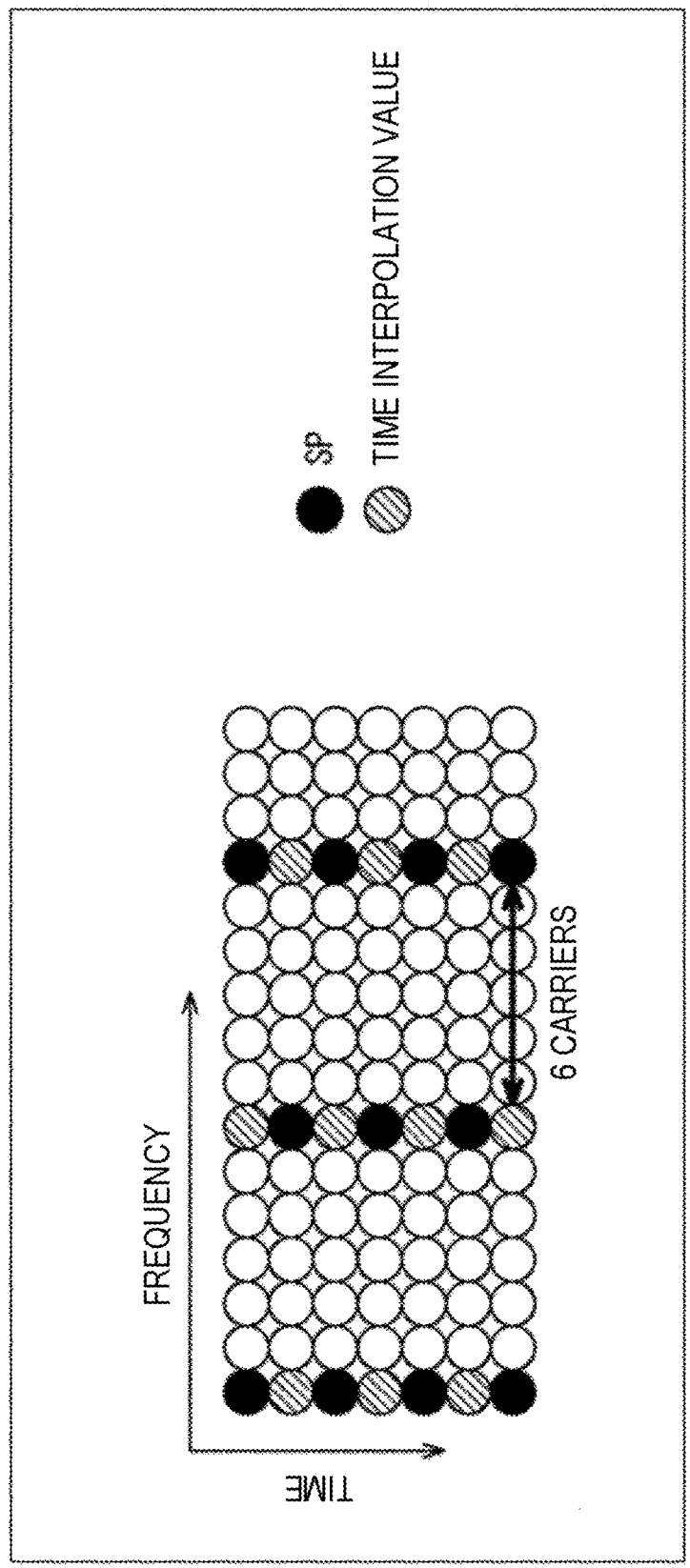
FIG. 7 is a diagram illustrating an example of estimation of transmission path characteristics of positions of data symbols by time interpolation.

FIG. 7 is a diagram illustrating an example of estimation of transmission path characteristics of positions of data symbols by time interpolation.

In the reception device 12, the transmission path characteristics of the positions of the data symbols in the column (frequency) of the pilot symbols can be estimated by performing time interpolation using the transmission path characteristics of the positions of the pilot symbols arranged in the column of the data symbols.

In FIG. 7, hatched circles represent data symbols (at positions) whose transmission path characteristics have been estimated by time interpolation.

In FIG. 7, the transmission path characteristics can be obtained for every (position of) six transmission symbols for each OFDM symbol by time interpolation.

The transmission path characteristics of the positions of the pilot symbols and the transmission path characteristics of the positions of the data symbols estimated by time interpolation using the transmission path characteristics are also collectively referred to as the transmission path characteristics after time interpolation.

Figure 8:
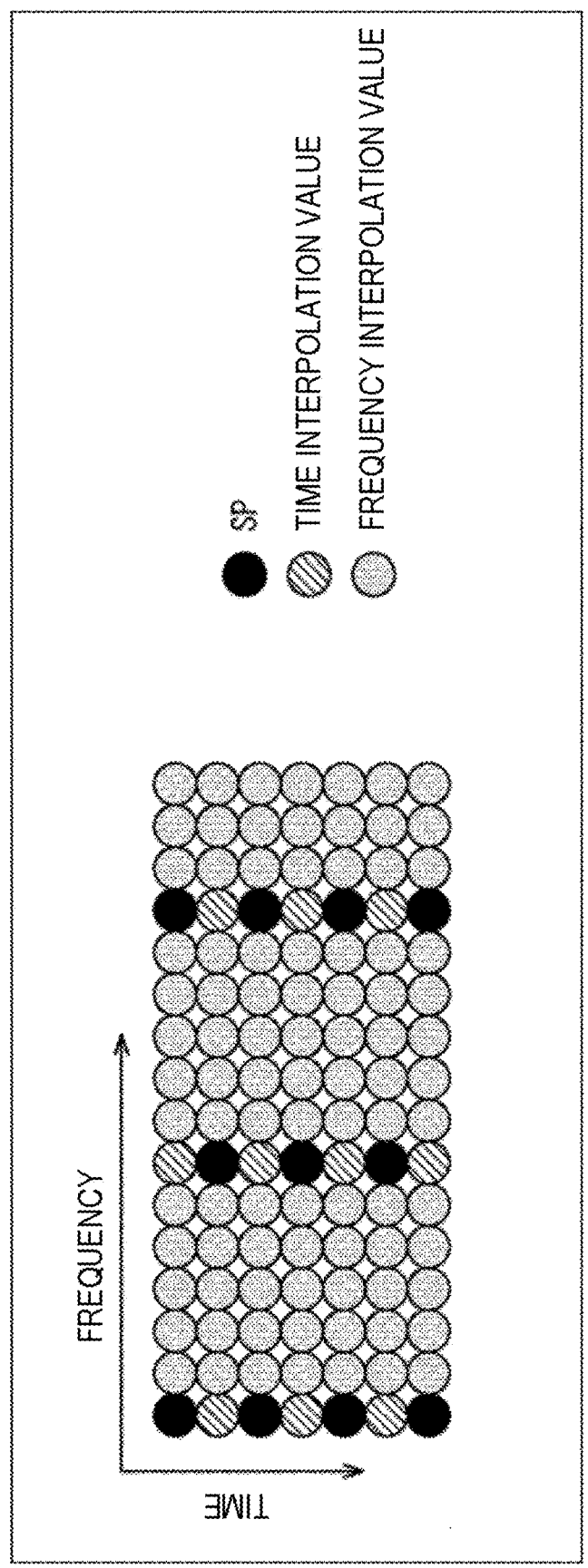
FIG. 8 is a diagram illustrating an example of estimation of transmission path characteristics of positions of data symbols by frequency interpolation.

FIG. 8 is a diagram illustrating an example of estimation of transmission path characteristics of positions of data symbols by frequency interpolation.

The reception device 12 can estimate the transmission path characteristics of the positions of the data symbols of each OFDM symbol (each row (time)) by performing frequency interpolation using the transmission path characteristics of the positions of the pilot symbols arranged in the row of the data symbols or the transmission path characteristics after time interpolation.

In FIG. 8, thin shaded circles represent data symbols (at positions) whose transmission path characteristics have been estimated by frequency interpolation.

In FIG. 8, the transmission path characteristics of the positions of the data symbols for which the transmission path characteristics are not estimated are estimated by frequency interpolation using the transmission path characteristics after time interpolation.

In the present embodiment, the transmission path characteristics after time interpolation (in FIG. 8, portions indicated by black circles and portions indicated by hatched circles) are transmission path characteristics of the positions of every six transmission symbols in the frequency direction. In such frequency interpolation using the transmission path characteristics after time interpolation, the transmission path characteristics of the positions of five transmission symbols among every six transmission symbols (positions of five circles between black circle and hatched circle) in the frequency direction are estimated.

Note that the transmission path characteristics (portions indicated by black circles in FIG. 8) of the positions of the pilot symbols are transmission path characteristics of the positions of every 12 pilot symbols in the frequency direction. In such frequency interpolation using the transmission path characteristics of the positions of the pilot symbols, the transmission path characteristics of the positions of 11 transmission symbols among every 12 pilot symbols in the frequency direction (the positions of 11 circles between black circles) are estimated.

<First Configuration Example of Transmission Path Characteristic Estimation Unit 45>

Figure 9:
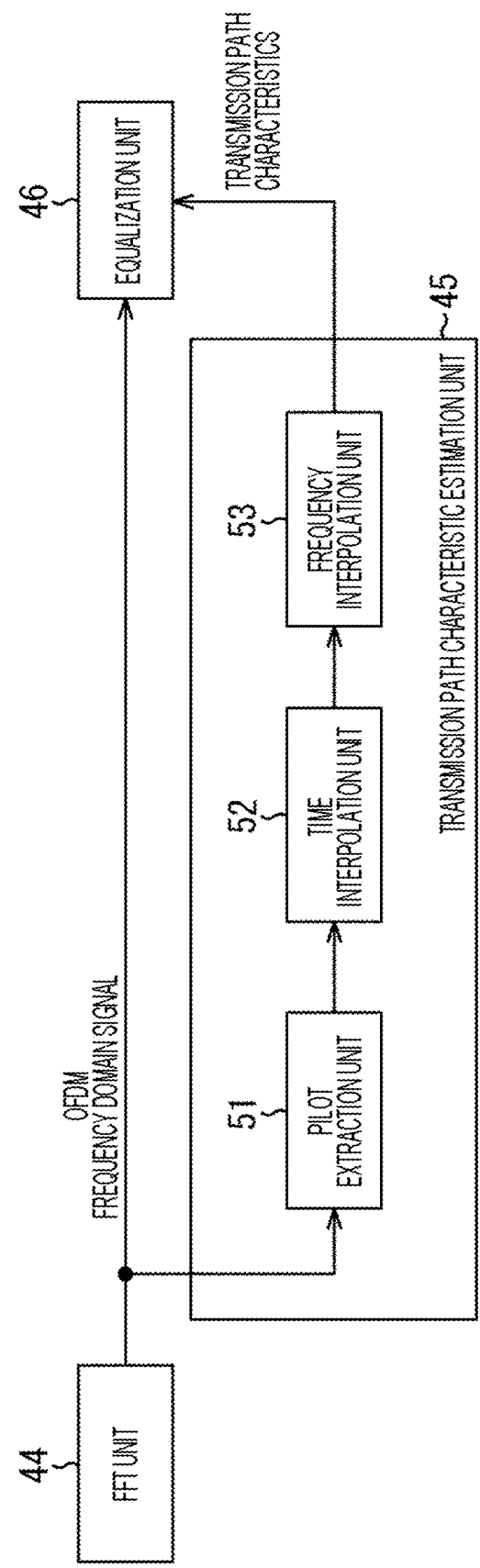
FIG. 9 is a block diagram illustrating a first configuration example of a transmission path characteristic estimation unit 45.

FIG. 9 is a block diagram illustrating a first configuration example of the transmission path characteristic estimation unit 45 in FIG. 4.

In FIG. 9, the transmission path characteristic estimation unit 45 includes a pilot extraction unit 51, a time interpolation unit 52, and a frequency interpolation unit 53.

An OFDM frequency domain signal is supplied from the FFT unit 44 to the pilot extraction unit 51.

The pilot extraction unit 51 extracts, for example, pilot symbols arranged as illustrated in FIG. 6 from the OFDM frequency domain signal from the FFT unit 44.

The pilot extraction unit 51 estimates the transmission path characteristics of the positions of the pilot symbols by using the pilot symbols extracted from the OFDM frequency domain signal and the pilot symbols of the known pilot signals, and supplies the transmission path characteristics to the time interpolation unit 52.

The time interpolation unit 52 performs time interpolation using the transmission path characteristics of the positions of the pilot symbols from the pilot extraction unit 51 to generate (estimate) the transmission path characteristics after the time interpolation, and supplies the transmission path characteristics to the frequency interpolation unit 53.

The frequency interpolation unit 53 performs frequency interpolation using the transmission path characteristics after the time interpolation from the time interpolation unit 52 to estimate the transmission path characteristics of the positions of all the transmission symbols of the OFDM symbol, and supplies the transmission path characteristics to the equalization unit 46.

<Configuration Example of Frequency Interpolation Unit 53>

Figure 10:
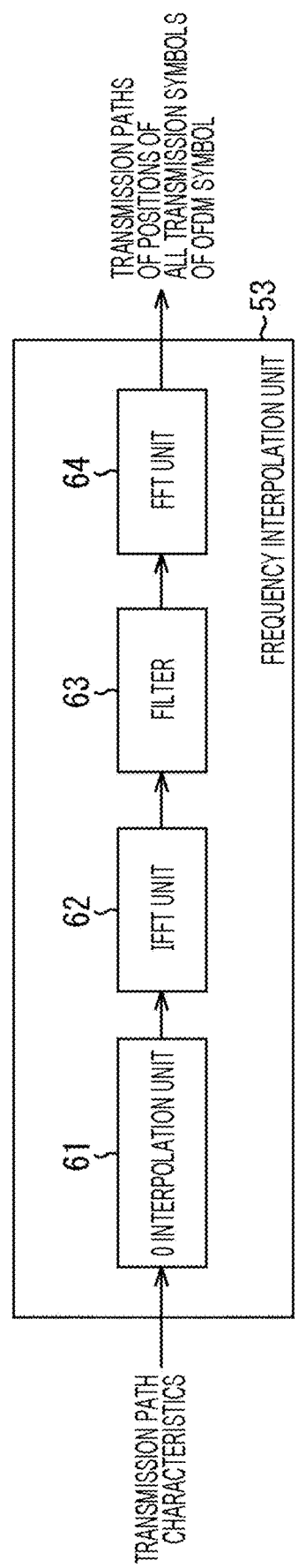
FIG. 10 is a block diagram illustrating a configuration example of a frequency interpolation unit 53.

FIG. 10 is a block diagram illustrating a configuration example of the frequency interpolation unit 53 in FIG. 9.

The frequency interpolation unit 53 includes a 0 interpolation unit 61, an IFFT unit 62, a filter 63, and an FFT unit 64.

The transmission path characteristics after the time interpolation are supplied from the time interpolation unit 52 to the 0 interpolation unit 61.

The 0 interpolation unit 61 interpolates a predetermined number of zeros as new sample values between the sample values of the transmission path characteristics after the time interpolation from the time interpolation unit 52 to generate the transmission path characteristics after the zero interpolation in which the number of sample values is multiplied by the original predetermined number+1, and supplies the transmission path characteristics after the zero interpolation to the IFFT unit 62.

In the 0 interpolation unit 61, in the OFDM symbol, zeros are interpolated by the number of transmission symbols between the transmission symbols whose transmission path characteristics have been estimated, that is, the number of transmission symbols whose transmission path characteristics are estimated by frequency interpolation.

Here, in the frequency interpolation using the transmission path characteristics after the time interpolation, the transmission path characteristics of the positions of five transmission symbols among every six transmission symbols in the frequency direction are estimated as described with reference to FIG. 8, and thus, five zeros are interpolated.

The IFFT unit 62 performs IFFT of the transmission path characteristics after the zero interpolation from the 0 interpolation unit 61 and supplies the same to the filter 63.

The transmission path characteristics after the zero interpolation from the 0 interpolation unit 61 is a signal in the frequency domain, and the IFFT unit 62 converts the transmission path characteristics after the zero interpolation in the frequency domain into the transmission path characteristics after the zero interpolation in the time domain by IFFT, and supplies the transmission path characteristics after the zero interpolation to the filter 63.

The filter 63 is a low pass filter (LPF) that performs filtering for interpolation of the transmission path characteristics in the frequency direction, and filters the transmission path characteristics after zero interpolation from the IFFT unit 62.

Due to zeros to the transmission path characteristics in the 0 interpolation unit 61, folding components are generated in the transmission path characteristics after the zero interpolation. By filtering by the filter 63, the folding components generated in the transmission path characteristics after the zero interpolation are removed, and the transmission path characteristics interpolated in the frequency direction, that is, the transmission path characteristics of (the positions of) all the transmission symbols of the OFDM symbol are generated.

The transmission path characteristics of the positions of all the transmission symbols of the OFDM symbol obtained by the filtering in the filter 63 is a signal in the time domain, and the transmission path characteristics in the time domain are supplied from the filter 63 to the FFT unit 54.

The FFT unit 54 converts the transmission path characteristics of the positions of all the transmission symbols of the OFDM symbol in the time domain from the filter 63 into the transmission path characteristics of the positions of all the transmission symbols of the OFDM symbol in the frequency domain by FFT, and supplies the transmission path characteristics to the equalization unit 46.

Figure 11:
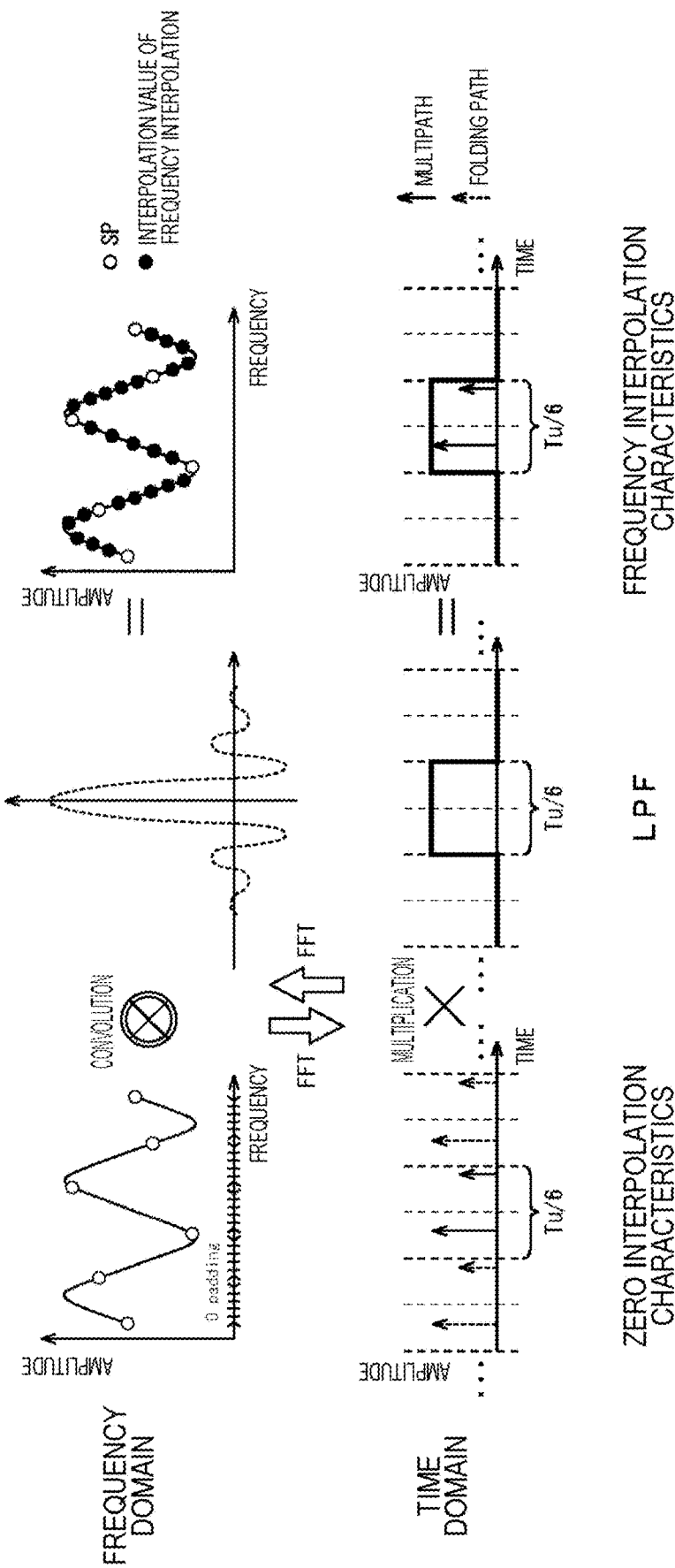
FIG. 11 is a diagram for explaining frequency interpolation using transmission path characteristics after time interpolation in the frequency interpolation unit 53.

FIG. 11 is a diagram for explaining frequency interpolation using transmission path characteristics after time interpolation in the frequency interpolation unit 53.

In a case where the frequency interpolation unit 53 performs the frequency interpolation using the transmission path characteristics after the time interpolation, five zeros are interpolated between the sample values of the transmission path characteristics after the time interpolation in the frequency domain as described with reference to FIG. 10. The transmission path characteristics obtained as a result of this zero interpolation (hereinafter, also referred to as zero interpolation characteristics) include repetitive components in the time domain.

The transmission path characteristics after the time interpolation are a sequence of sample values of the transmission path characteristics for every (position of) six transmission symbols (in the frequency direction). As illustrated in FIG. 5, when the effective symbol length is represented by Tu [sec], the interval Fc between the subcarriers corresponding to the transmission symbols is Fc=1/Tu [Hz].

The interval between the sample values of the transmission path characteristics after the time interpolation, which is the sequence of the sample values of the transmission path characteristics for every six transmission symbols, is 6Fc=6/Tu [Hz].

The interval between the sample values of the zero interpolation characteristics obtained by interpolating five zeros between the sample values of the transmission path characteristics after the time interpolation is Fc=1/Tu [Hz].

Meanwhile, the transmission path characteristics after the time interpolation in which the interval between the sample values is 6Fc=6/Tu [Hz] is a signal having 1/(6Fc)=Tu/6 [sec] as one cycle in the time domain.

Furthermore, the zero interpolation characteristics in which the interval between the sample values is Fc=1/Tu [Hz] are a signal having 1/Fc=Tu [sec] as one cycle in the time domain, that is, a signal having 6 times the cycle Tu/6 of the transmission path characteristics after the time interpolation as one cycle.

As described above, in the zero interpolation characteristics in the time domain in which six times the cycle of the transmission path characteristics after the time interpolation in the time domain is one cycle, the transmission path characteristics after the time interpolation in the time domain are repeated six times.

FIG. 11 illustrates the zero interpolation characteristics, and the transmission path characteristics of all the transmission symbols of the OFDM symbol obtained by filtering of the zero interpolation characteristics using the filter 63, in each of the time domain and the frequency domain.

Note that, in FIG. 11, in order to simplify the description, it is assumed that the multipath includes two paths (a two-wave environment). The same applies to FIG. 13 described later.

The zero interpolation characteristics with the cycle of Tu [sec] have, in the time domain, multipaths (indicated by solid arrows in FIG. 11) corresponding to the transmission path characteristics after the time interpolation with the cycle of Tu/6 [sec] and five folding components (folding paths) (indicated by dotted arrows in FIG. 11) generated by interpolation of five zeros of the multipaths. Then, the zero interpolation characteristics with the cycle of Tu [sec] are obtained by repeating the multipaths corresponding to the transmission path characteristics after the time interpolation with the cycle of Tu/6 [sec] six times.

In the frequency interpolation, it is necessary to remove the folding paths and extract the original multipaths.

Therefore, in the filter 63 which is an LPF, the folding paths are removed by filtering the zero interpolation characteristics, and the original multipaths corresponding to the transmission path characteristics (hereinafter, also referred to as frequency interpolation characteristics) of all the transmission symbols of the OFDM symbol in which the transmission path characteristics of the positions of the transmission symbols in the frequency direction are interpolated are extracted.

Note that the filter 63 is an LPF that removes folding paths generated in the time domain and extracts original multipaths.

Thus, in the time domain, the filtering of the filter 63 is represented as the multiplication of the zero interpolation characteristics and the window function corresponding to the passband (time) of the LPF as the filter 63. In the frequency domain, the filtering of the filter 63 is a convolution of the zero interpolation characteristics and the filter coefficient of the filter 63 (the impulse response of the passband in the time domain).

Meanwhile, the reception device 12 may be a fixed receiver installed at home, or may be a movable mobile terminal such as a smartphone, an in-vehicle receiver, or the like.

In a case where the reception device 12 is a mobile terminal, particularly, is moving at a high speed, when the transmission path characteristic estimation unit 45 performs time interpolation, performs frequency interpolation using the transmission path characteristics after the time interpolation, and estimates (generates) the frequency interpolation characteristics, an error of the estimated value of the frequency interpolation characteristics with respect to the current transmission path characteristics increases due to the movement of the reception device 12 in the reception device 12 after the movement, and it may be difficult to appropriately equalize the OFDM signal.

<Second Configuration Example of Transmission Path Characteristic Estimation Unit 45>

Figure 12:
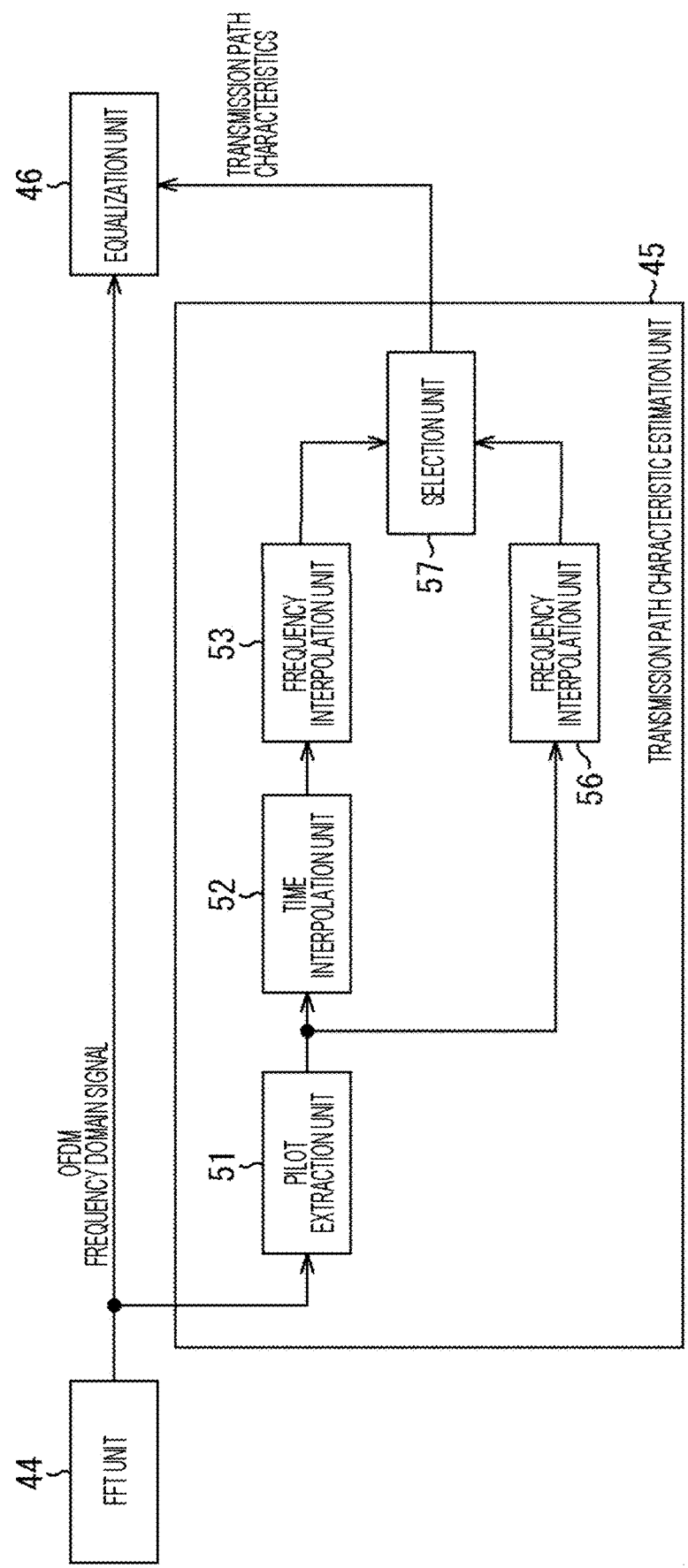
FIG. 12 is a block diagram illustrating a second configuration example of the transmission path characteristic estimation unit 45.

FIG. 12 is a block diagram illustrating a second configuration example of the transmission path characteristic estimation unit 45 in FIG. 4.

Note that, in the drawing, portions corresponding to those in the case of FIG. 9 are denoted by the same reference numerals, and the description thereof will be appropriately omitted below.

In FIG. 12, the transmission path characteristic estimation unit 45 includes the pilot extraction unit 51 to the frequency interpolation unit 53. Moreover, the transmission path characteristic estimation unit 45 includes a frequency interpolation unit 56 and a selection unit 57.

Therefore, the transmission path characteristic estimation unit 45 of FIG. 12 is common to the case of FIG. 9 in including the pilot extraction unit 51 to the frequency interpolation unit 53, and is different from the case of FIG. 9 in newly including the frequency interpolation unit 56 and the selection unit 57.

The transmission path characteristics of (the positions of) the pilot symbols are supplied from the pilot extraction unit 51 to the frequency interpolation unit 56.

The frequency interpolation unit 56 is configured similarly to the frequency interpolation unit 53, and estimates the frequency interpolation characteristics by performing frequency interpolation using the transmission path characteristics of the pilot symbols from the pilot extraction unit 51 and supplies the frequency interpolation characteristics to the selection unit 57.

Here, in order to distinguish between frequency interpolation characteristics estimated by the frequency interpolation unit 53 and frequency interpolation characteristics estimated by the frequency interpolation unit 56, the frequency interpolation characteristics estimated by the frequency interpolation unit 53 are also referred to as first frequency interpolation characteristics. The frequency interpolation characteristics estimated by the frequency interpolation unit 56 are also referred to as second frequency interpolation characteristics.

The selection unit 57 is supplied with the second frequency interpolation characteristics from the frequency interpolation unit 56, and is also supplied with the first frequency interpolation characteristics from the frequency interpolation unit 53.

The selection unit 57 selects, for example, frequency interpolation characteristics with a smaller error from the first frequency interpolation characteristics from the frequency interpolation unit 53 and the second frequency interpolation characteristics from the frequency interpolation unit 56, and supplies the frequency interpolation characteristics to the equalization unit 46.

Figure 13:
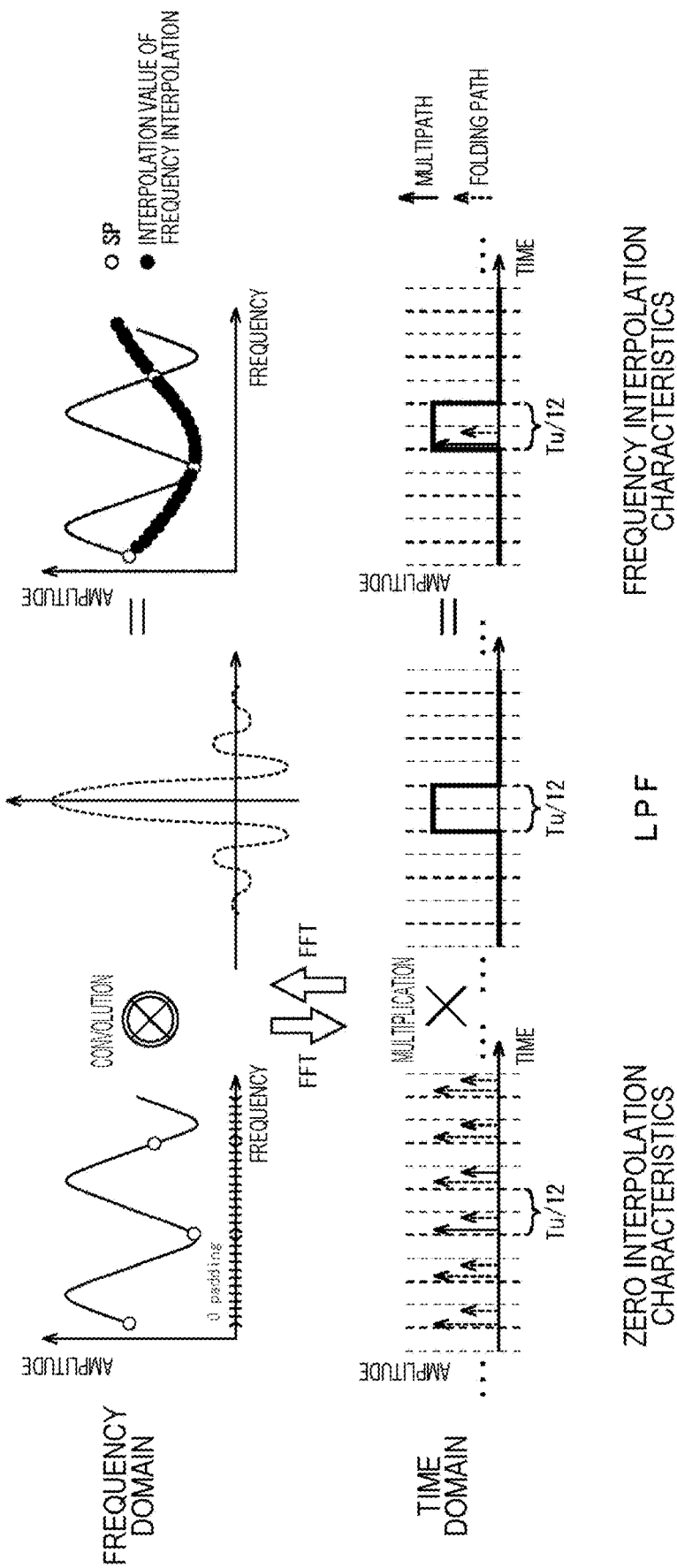
FIG. 13 is a diagram for explaining frequency interpolation using transmission path characteristics of pilot symbols in a frequency interpolation unit 56.

As the error of the frequency interpolation characteristics, for example, a difference between the pilot symbols in the OFDM signal after equalization using the frequency interpolation characteristics and the true values of the pilot symbols or the like can be adopted. FIG. 13 is a diagram for explaining frequency interpolation using transmission path characteristics of pilot symbols in the frequency interpolation unit 56.

In the frequency interpolation using the transmission path characteristics of the pilot symbols, as described with reference to FIG. 8, the transmission path characteristics of the positions of 11 transmission symbols among every 12 transmission symbols in the frequency direction are estimated. Therefore, in the frequency interpolation using the transmission path characteristics of the pilot symbols, 11 zeros are interpolated between the sample values of the transmission path characteristics of the pilot symbols in the frequency domain.

The zero interpolation characteristics obtained as a result of the interpolation of 11 zeros include repetitive components in the time domain.

The transmission path characteristics of the pilot symbols are a sequence of sample values of the transmission path characteristics for every (position of) 12 transmission symbols (in the frequency direction).

Similarly to FIG. 11, the effective symbol length is represented by Tu [sec], and the interval between the sub-carriers corresponding to the transmission symbols is represented by Fc=1/Tu [Hz]. In this case, the interval between the sample values of the transmission path characteristics of the pilot symbols that is the sequence of the sample values of the transmission path characteristics for every 12 transmission symbols is 12Fc=12/Tu [Hz].

The interval between the sample values of the zero interpolation characteristics obtained by interpolating 11 zeros between the sample values of the transmission path characteristics of the pilot symbols is Fc=1/Tu [Hz].

Meanwhile, the transmission path characteristics of the pilot symbols in which the interval between the sample values is 12Fc=12/Tu [Hz] is a signal having 1/(12Fc)=Tu/12 [sec] as one cycle in the time domain.

Furthermore, the zero interpolation characteristics in which the interval between the sample values is Fc=1/Tu [Hz] are a signal having 1/Fc=Tu [sec] as one cycle in the time domain, that is, a signal having 12 times the cycle Tu/12 of the transmission path characteristics of the pilot symbols as one cycle.

As described above, in the zero interpolation characteristics in the time domain in which 12 times the cycle of the transmission path characteristics of the pilot symbols in the time domain is one cycle, the transmission path characteristics of the pilot symbols in the time domain are repeated 12 times.

FIG. 13 illustrates zero interpolation characteristics obtained by interpolating 11 zeros to the transmission path characteristics of the pilot symbols, and second frequency interpolation characteristics obtained by filtering the zero interpolation characteristics by the LPF (corresponding to the filter 63), in each of the time domain and the frequency domain.

The zero interpolation characteristics with the cycle of Tu [sec] have, in the time domain, a multipaths (indicated by solid arrows in FIG. 13) corresponding to the transmission path characteristics of the pilot symbols with the cycle of Tu/12 [sec] and folding paths (indicated by dotted arrows in FIG. 13) as 11 folding components generated by interpolation of 11 zeros of the multipaths. The zero interpolation characteristics with the cycle of Tu [sec] are obtained by repeating the multipaths corresponding to the transmission path characteristics of the pilot symbols with the cycle of Tu/12 [sec] 12 times.

In the frequency interpolation, it is necessary to remove the folding paths and extract the original multipaths.

Therefore, in the frequency interpolation unit 56, the folding paths are removed by filtering the zero interpolation characteristics in the LPF, and the original multipaths corresponding to the second frequency interpolation characteristics in which the transmission path characteristics of the positions of the transmission symbols in the frequency direction are interpolated are extracted.

Similarly to the case described in FIG. 11, in the time domain, the filtering of the LPF is represented as multiplication of the zero interpolation characteristics and the window function corresponding to the passband of the LPF. In the frequency domain, the filtering of the LPF is a convolution of the zero interpolation characteristics and the filter coefficient of the LPF.

In a case where the second frequency interpolation characteristics are estimated by the frequency interpolation using the transmission path characteristics of the pilot symbols, the frequency interpolation characteristics can be estimated in a shorter time because the time interpolation is not performed as compared with the case of estimating the first frequency interpolation characteristics by the time interpolation using the transmission path characteristics of the pilot symbols and the frequency interpolation using the transmission path characteristics after the time interpolation.

Therefore, in a case where the reception device 12 is moving, it is possible to estimate the frequency interpolation characteristics with a small error with respect to the current transmission path characteristics.

In the transmission path characteristic estimation unit 45 in FIG. 12, the first frequency interpolation characteristics tend to be easily selected in the stationary environment in which the reception device 12 is not moving, and the second frequency interpolation characteristics tend to be easily selected in the moving environment in which the reception device 12 is moving.

In frequency interpolation, folding paths are included in zero interpolation characteristics obtained by zero interpolation. In the frequency interpolation, in order to remove the folding paths and extract the original multipaths, filtering with zero interpolation characteristics is performed by the LPF, but in order to extract the original multipaths by filtering, a maximum delay time of the multipaths, that is, a time difference between a first path (path reaching first) and a last path (path reaching last) in the multipaths needs to be Tu/N [sec] or less.

Here, N represents a cycle (interval) of transmission symbols in the frequency direction at which transmission path characteristics used for frequency interpolation are obtained, and is hereinafter also referred to as an interpolation symbol cycle. In the present embodiment, the interpolation symbol cycle N=12 in the transmission path characteristics of the pilot symbols, and the interpolation symbol cycle N=6 in the transmission path characteristics after the time interpolation. That is, the transmission path characteristics of the pilot symbols are the transmission path characteristics of the positions of every 12 transmission symbols (pilot symbols) in the frequency direction, and the transmission path characteristics after time interpolation are the transmission path characteristics of the positions of every 6 transmission symbols in the frequency direction.

From the above, in a case where frequency interpolation using the transmission path characteristics of the pilot symbols is performed, the maximum delay time needs to be Tu/12 [sec] or less.

This is because, since the zero interpolation characteristics is such that the multipaths corresponding to the transmission path characteristics of the pilot symbols having the cycle of Tu/12 [sec] are repeated N=12 times, the bandwidth of the passband of the LPF needs to be equal to or less than Tu/12 [sec] equal to the cycle of the multipaths repeatedly generated in the zero interpolation characteristics in order to extract only the original multipaths by filtering by the LPF.

In FIG. 13, the maximum delay time of the multipaths exceeds Tu/12 [sec].

In a case where the maximum delay time of the multipaths exceeds Tu/12 [sec], the entire path from the first path to the first path of the original multipaths does not fit in the passband of the LPF. Moreover, a part of the folding paths enters the passband of the LPF.

In this case, in the filtering by the LPF, only the original multipaths cannot be extracted, and as a result, the accuracy of the frequency interpolation characteristics is deteriorated.

In a case where the maximum delay time of the multipaths exceeds Tu/N [sec], it is difficult to fit only the entire original multipaths within the passband of the LPF regardless of how to adjust the bandwidth of the passband of the LPF.

Therefore, the accuracy of the frequency interpolation characteristics is deteriorated, the OFDM signal cannot be appropriately equalized, and the reception performance of the reception device is deteriorated.

Figure 14:
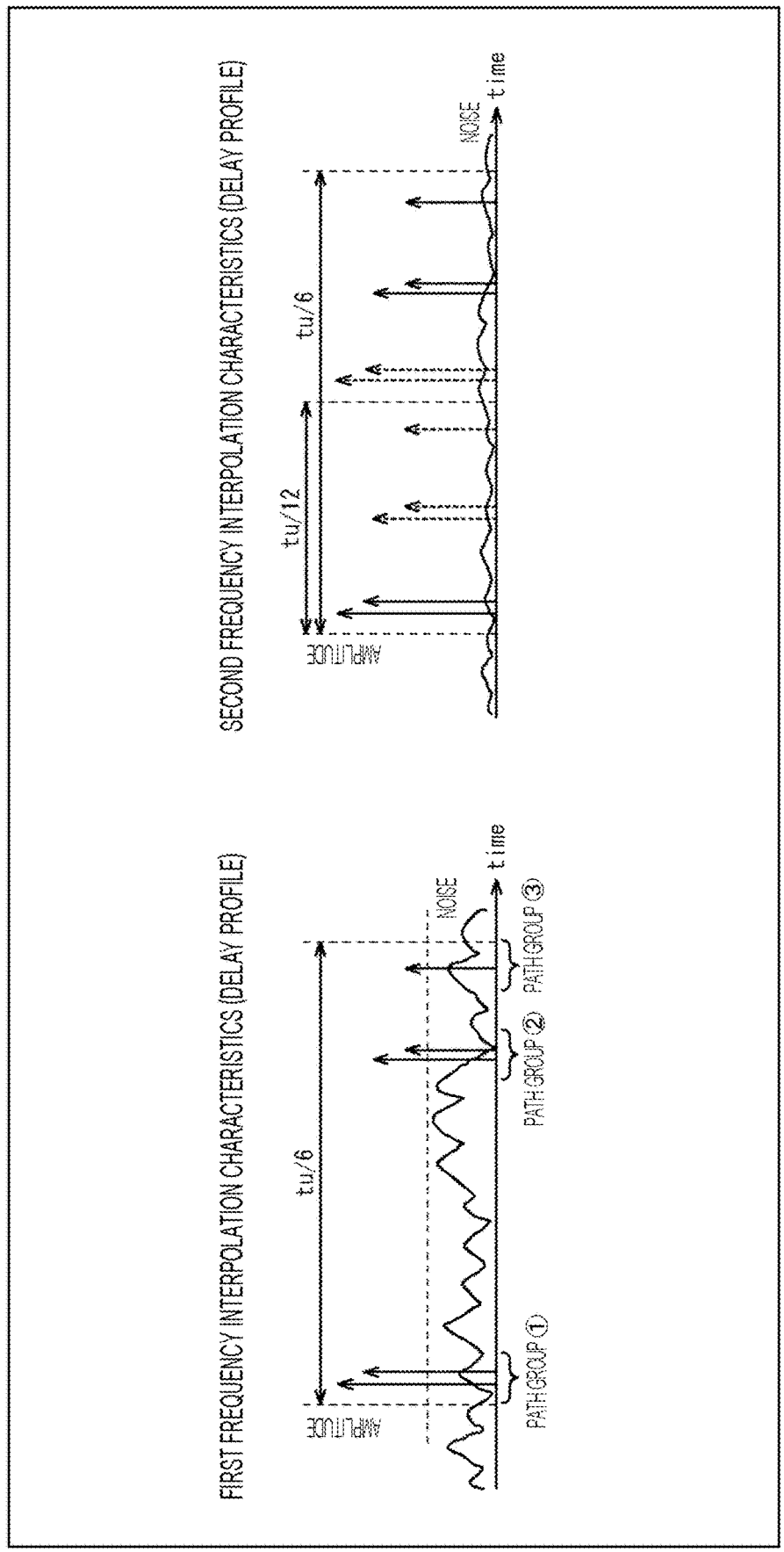
FIG. 14 is a diagram illustrating an example of first frequency interpolation characteristics estimated by performing time interpolation and frequency interpolation and second frequency interpolation characteristics estimated by performing frequency interpolation.

FIG. 14 is a diagram illustrating an example of first frequency interpolation characteristics estimated by performing time interpolation and frequency interpolation and second frequency interpolation characteristics estimated by performing frequency interpolation.

In FIG. 14, the maximum delay time of the multipaths is within Tu/6 [sec], but exceeds Tu/12 [sec].

In the frequency interpolation for estimating the first frequency interpolation characteristics, since the interpolation symbol cycle N=6, even if the maximum delay time exceeds Tu/12 [sec], the folding paths can be removed within Tu/6 [sec].

However, in the estimation of the first interpolation frequency characteristics, since the time interpolation is performed before the frequency interpolation, in a case where the reception device 12 is moving, the actual transmission path characteristics change during the estimation of the first frequency interpolation characteristics, the error of the first frequency interpolation characteristics with respect to the current transmission path characteristics increases, and it becomes difficult to appropriately equalize the OFDM signal.

Meanwhile, since the time interpolation is not performed in the estimation of the second frequency interpolation characteristics, the second frequency interpolation characteristics can be estimated in a short time. Therefore, even if the reception device 12 is moving, it is possible to estimate the second frequency interpolation characteristics with a small error with respect to the current transmission path characteristics.

However, in the frequency interpolation for estimating the second frequency interpolation characteristics, since the interpolation symbol cycle N=12, in a case where multipaths (in the figure, indicated by solid arrows) in which the maximum delay time exceeds Tu/12 [sec] are generated, the folding paths (in the figure, indicated by dotted arrows) enter within the time in which the multipaths (original multipaths) exist, and it becomes difficult to remove the folding paths by the LPF. Therefore, the second frequency interpolation characteristics are affected by the folding paths, and the accuracy is deteriorated.

Therefore, a method is considered in which the number of pilot symbols in the OFDM symbol is increased, and the interpolation symbol cycle N in the frequency interpolation for estimating the second frequency interpolation characteristics is decreased, so that the folding paths do not enter within the time in which the original multipaths exist for the multipaths having the large maximum delay time Tu/N [sec].

However, when the number of pilot symbols in the OFDM symbol is increased, the number of data symbols is decreased, and transmission efficiency of data originally desired to be transmitted (data to be originally transmitted such as content of a program or the like) is deteriorated.

Therefore, in the frequency interpolation, by using a plurality of filters for the filtering of the zero interpolation characteristics obtained by the zero interpolation, a method of extracting only the original multipaths and removing the folding paths even in a case where the folding paths enter within the time in which the original paths exist is considered.

However, even in the case of using a plurality of filters, when the original paths and the folding paths exist at positions substantially overlapping each other, it may be difficult to extract only the original multipaths and remove the folding paths.

Therefore, in the present technology, the transmission device 11 injects a transmission identification signal indicating transmission identification information for identifying the transmission device 11 into the OFDM signal, and the reception device 12 estimates the transmission path characteristics using the correlation between the OFDM signal into which the transmission identification signal is injected and the predetermined transmission identification signal, thereby improving the reception performance of the reception device 12. That is, according to the present technology, the reception device 12 can accurately estimate the transmission path characteristics and appropriately equalize the OFDM signal.

Examples of the transmission identification signal include a transmitter identification (TxID) signal specified in ATSC 3.0. The TxID signal is a signal representing a TxID that uniquely identifies the transmission device.

Hereinafter, before describing the transmission identification signal adopted in the present technology, the TxID signal of ATSC 3.0 described in Non-Patent Document 1 will be described.

<TxID Signal>

Figure 15:
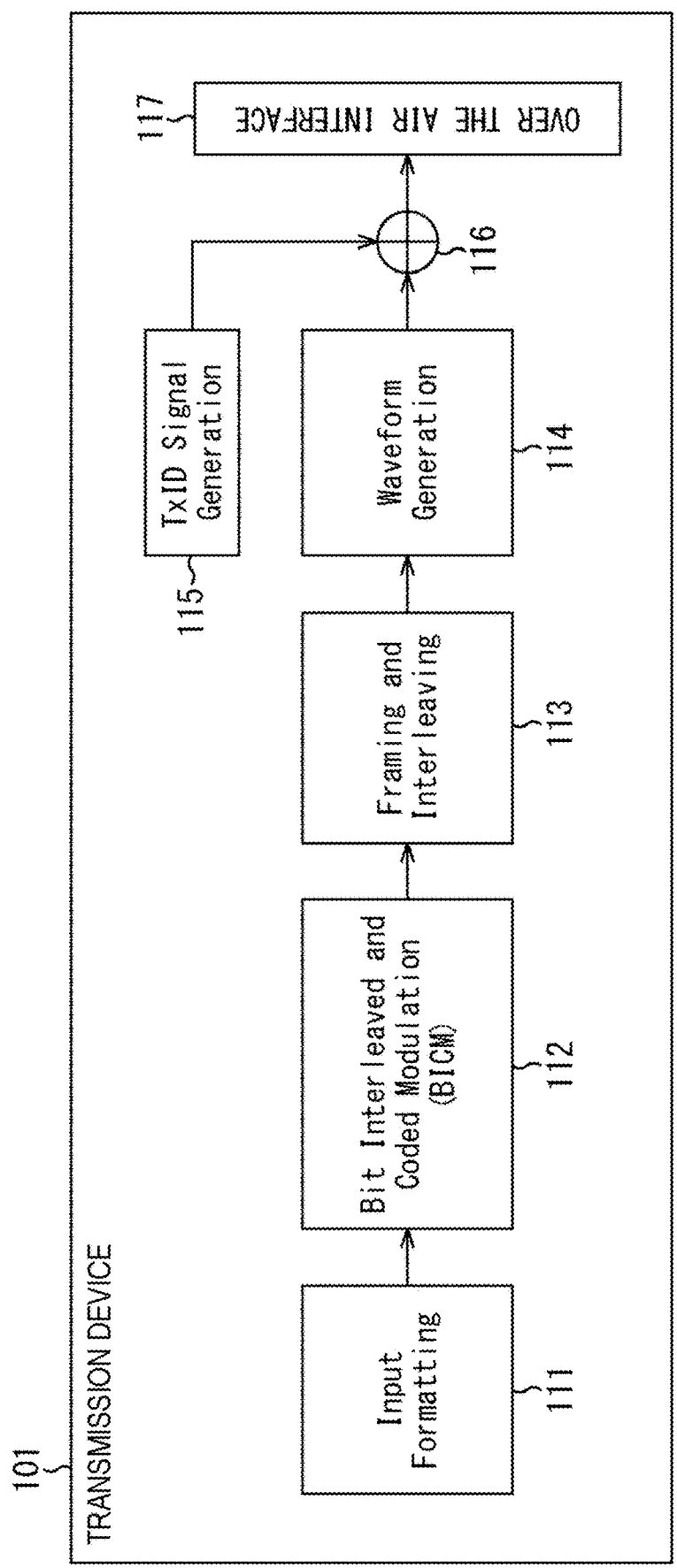
FIG. 15 is a block diagram illustrating a configuration example of a transmission device of ATSC 3.0 in a case where a TxID signal is injected into an OFDM signal.

FIG. 15 is a block diagram illustrating a configuration example of a transmission device of ATSC 3.0 in a case where a TxID signal is injected into an OFDM signal.

The terrestrial digital broadcasting in ATSC 3.0 is started in Korea in 2017, and is scheduled to be started in the United States in 2020. In the terrestrial digital broadcasting in ATSC 3.0, a combination of SFN and OFDM can be adopted.

TxID is defined in Annex N of Non-Patent Document 1, which is a standard document that defines the physical layer of ATSC 3.0.

By using the TxID, transmission path characteristics (delay profile) between the transmission device and the reception device can be estimated.

The support for TxID is optional, and currently, equipment for professional use may be supported, but a television (TV) receiver installed at home and a TV receiver for automobiles are not supported.

In the transmission device supporting the TxID, a Gold sequence as a unique TxID for uniquely identifying the transmission device is generated, and the TxID is subjected to BPSK modulation (by the TxID) to generate a TxID signal.

In the transmission device, the level of the TxID signal is adjusted according to an injection level (IL) set in advance. IL is set to a value within a range from −9 dB (strong) to −45 dB (weak) defined in the standard document.

In the transmission device, the level-adjusted TxID signal is injected by adding (superimposing) the level-adjusted TxID signal to the OFDM signal (host signal) of the data to be transmitted of the terrestrial digital broadcasting in ATSC 3.0 in the time domain, and the OFDM signal into which the TxID signal is injected is transmitted.

Thus, the TxID signal may be a direct sequence buried spread spectrum (DSBSS) radio frequency (RF) watermark signal representing a Gold sequence as a unique TxID.

In FIG. 15, the transmission device 101 includes an input formatting unit 111, a BICM unit 112, a framing and interleaving unit 113, a waveform generation unit 114, a TxID signal generation unit 115, an injection unit 116, and a wireless interface (OVER THE AIR INTERFACE) 117.

Data to be transmitted is supplied to the input formatting unit 111. The input formatting unit 111 converts data to be transmitted into data of a predetermined format and supplies the data to the BICM unit 112.

The BICM unit 112 performs FEC encoding processing, mapping to constellation, and the like on the data from the input formatting unit 111, and supplies the resultant transmission symbols to the framing and interleaving unit 113.

The framing and interleaving unit 113 performs time interleaving and frequency interleaving for (the sequence of) the transmission symbols from the BICM unit 112, configures a frame of ATSC 3.0, and supplies the frame to the waveform generation unit 114.

The waveform generation unit 114 generates an OFDM signal as a broadcast signal corresponding to the frame from the framing and interleaving unit 113, and supplies the OFDM signal to the injection unit 116.

The TxID signal generation unit 115 generates a TxID signal representing a TxID for identifying the transmission device 101, and supplies the TxID signal to the injection unit 116.

The injection unit 116 injects the TxID signal from the TxID signal generation unit 115 into the OFDM signal as the broadcast signal from the waveform generation unit 114, and supplies the OFDM signal after the injection of the TxID signal to the wireless interface 117.

The wireless interface 117 performs frequency conversion on the OFDM signal after the injection of the TxID signal from the injection unit 116, and wirelessly transmits the OFDM signal after the frequency conversion.

Figure 16:
FIG. 16 is a diagram for explaining injection of a TxID signal into an OFDM signal by an injection unit 116.

FIG. 16 is a diagram for explaining the injection of the TxID signal into the OFDM signal in the injection unit 116.

In the OFDM signal of ATSC 3.0, the frame is configured by arranging a bootstrap at the head and then arranging a plurality of OFDM symbols with GI at the head.

In the frame, immediately after the bootstrap, one or more OFDM symbols (hereinafter, also referred to as preamble symbols) including transmission symbols of the preamble is arranged, and thereafter, OFDM symbols including transmission symbols of data to be transmitted are arranged.

In the injection unit 116, the TxID signal is injected into only one OFDM symbol at the head of the frame, that is, one of the preamble symbols.

Furthermore, in the injection unit 116, one or more TxID signals are injected within a range (of time) that fits in the OFDM symbol at the head of the frame.

In ATSC 3.0, a Gold sequence as a TxID is generated according to a generator polynomial of a 13 degree order. Therefore, the Gold sequence as the TxID is a sequence of $2^{13}-1=8191$ bits (cycle).

In a case where the FFT size of the OFDM symbol at the time of performing IFFT and FFT is, for example, 16 k (1 k is 1024), a maximum of two TxID signals representing the 8191 bit TxID (two TxIDs of 8191 bits) fit in the OFDM symbol.

Therefore, in the injection unit 116, in a case where the FFT size is 16 k, as illustrated in FIG. 16, 8191 bit TxID signals (representing TxID) are injected so as to be repeatedly arranged by two.

In the injection unit 116, the TxID signals are injected in synchronization with the OFDM signal, that is, the head of the preamble symbol coincides with the head of the first TxID signal.

Note that, in a case where the FFT size is 8 k, only one 8191 bit TxID signal is arranged. In a case where the FFT size is 32 k, 8191 bit TxID signals are injected so as to be repeatedly arranged by four.

Figure 17:
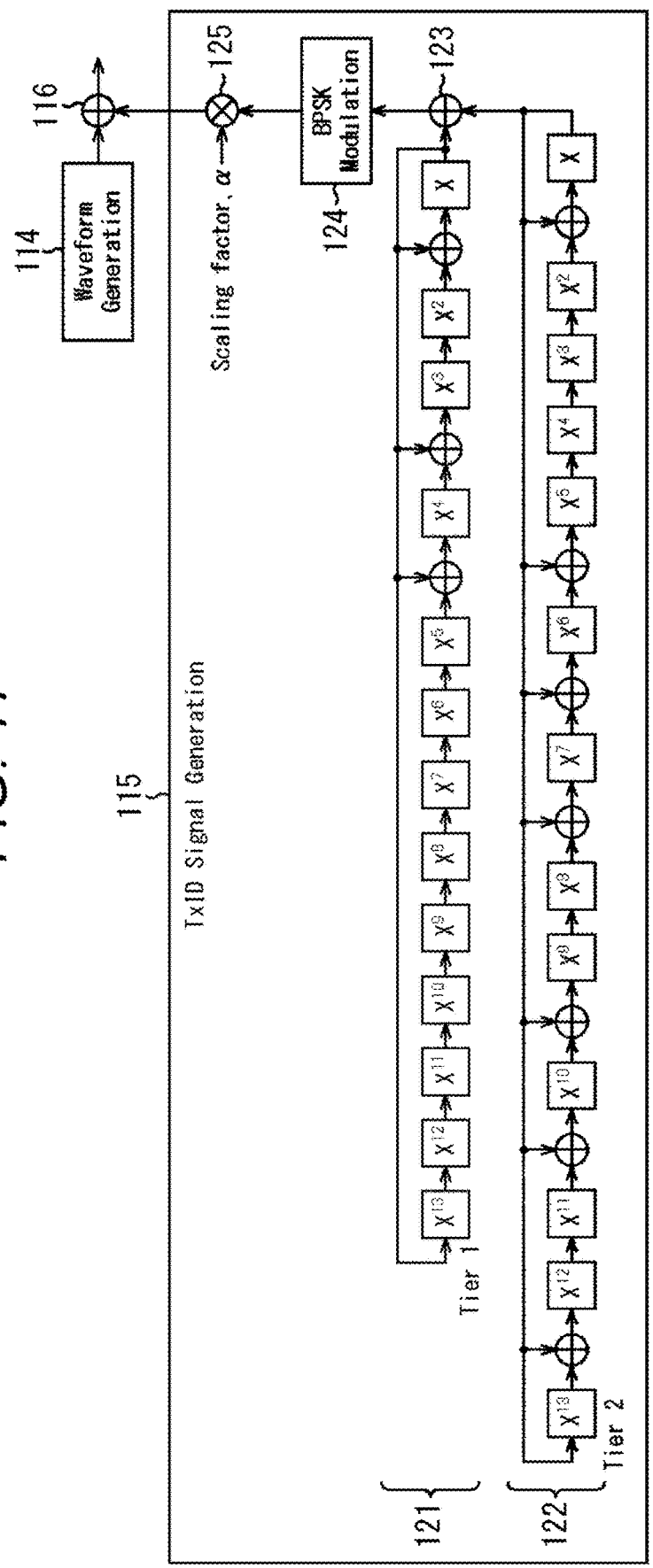
FIG. 17 is a block diagram illustrating a configuration example of a TxID signal generation unit 115.

FIG. 17 is a block diagram illustrating a configuration example of the TxID signal generation unit 115 in FIG. 15.

The TxID signal generation unit 115 includes a first-stage register group 121, a second-stage register group 122, a combining unit 123, a BPSK modulation unit 124, and a level adjustment unit 125.

The first-stage register group 121 includes 13 registers $x^1$ to $x^{13}$ corresponding to the generator polynomial $x^{13}+x^4+x^{40}+x+1$ and three EXOR circuits. The first-stage register group 121 generates an M sequence of $2^{13}-1$ bits (cycle) according to the generator polynomial $x^{13}+x^4+x^3+x+1$, and supplies the M sequence to the combining unit 123.

The second-stage register group 122 includes 13 registers $x^1$ to $x^{13}$ corresponding to the generator polynomial $x^{13}+x^{12}+x^{10}+x^9+x^7+x^6+x^5+x+1$, and seven EXOR circuits. The second-stage register group 122 generates a bit sequence according to the generator polynomial $x^{13}+x^{12}+x^{10}+x^9+x^7+x^6+x^5+x+1$ and supplies the bit sequence to the combining unit 123.

The combining unit 123 combines the M sequence from the first-stage register group 121 and the sequence from the second-stage register group 122 in units of bits (takes exclusive OR) to generate a Gold sequence as a TxID of $2^{13}-1=8191$ bits, and supplies the Gold sequence to the BPSK modulation unit 124.

The BPSK modulation unit 124 performs BPSK modulation on the TxID from the combining unit 123 to generate a TxID signal, and supplies the TxID signal to the level adjustment unit 125.

The level adjustment unit 125 multiplies the TxID signal from the BPSK modulation unit 124 by a scaling factor α corresponding to IL set in advance to adjust the level of the TxID signal according to IL, and supplies the TxID signal after the level adjustment to the injection unit 116.

FIG. 18 is a diagram illustrating initial values set in the first-stage register group 121 and the second-stage register group 122.

In the registers $x^1$ to $x^{13}$ of the first-stage register group 121, bits indicated by Tier 1 in FIG. 18 are set as initial values.

In the registers $x^1$ to $x^{13}$ of the second-stage register group 122, bits t0 to t12 indicated by Tier 2 in FIG. 18 are set as initial values, respectively.

A 13 bit sequence of bits t0 to t12 is called a txid address, and a unique value is assigned to each transmission device of ATSC 3.0.

In the second-stage register group 122, the bit sequence is generated using the 13 bit txid address unique to the transmission device as the initial value, so that the TxID generated by the combining unit 123 of the TxID signal generation unit 115 (FIG. 17) is information that can identify $2^{13}=8192$ transmission devices.

The TxID is adopted in ATSC 3.0 and is also proposed to be adopted in DVB-T2.

ATSC 3.0 and DVB-T2 correspond to hierarchical transmission (hereinafter, also referred to as time division hierarchical transmission) divided into layers in the time direction, and a robust preamble symbol exists in the OFDM signal. Then, only in the preamble symbol at the head of the frame, one or more TxID signals are injected in the time domain in such a manner that the head of the preamble symbol coincides with the head of the first TxID signal.

ISDB-T, which is the current terrestrial digital broadcasting standard in Japan, supports frequency division hierarchical transmission, and there is no robust preamble symbol in the OFDM signal (OFDM time domain signal). Even in an advanced method (standard) studied as a next-generation terrestrial digital broadcasting standard, similarly to ISDB-T, there is no robust preamble symbol supporting frequency division hierarchical transmission.

In the current terrestrial digital broadcasting in Japan, frequency division hierarchical transmission of two layers of A layer and B layer is performed as frequency division hierarchical transmission of ISDB-T. The A layer is more robust than the B layer.

Therefore, in a case where TxID is introduced into terrestrial digital broadcasting in Japan, similarly to ATSC 3.0, it is appropriate to inject a signal in a time domain such as a TxID signal into only an OFDM signal of robust A layer. However, in frequency division hierarchical transmission, it is difficult to inject a signal in a time domain such as a TxID signal into only the OFDM signal of the A layer.

In the frequency division hierarchical transmission, if a signal in a time domain such as a TxID signal is injected into the OFDM signal as in ATSC 3.0, not only the robust A layer but also the B layer is affected.

Furthermore, in ATSC 3.0, the TxID signal is injected into only one preamble symbol which is the OFDM symbol at the head of the frame.

In the advanced method, for example, in a case where 16 k is adopted as the FFT size and 800/16384 of the effective symbol length is adopted as the GI length, the frame length is 304 ms.

Therefore, in the advanced method, similarly to ATSC 3.0, in a case where a signal in the time domain such as the TxID signal is injected only into the OFDM symbol at the head of the frame, it is difficult to say that the transmission frequency of the signal in the time domain is a frequency sufficient for estimating the transmission path characteristics with high accuracy for the moving reception device.

From the above, even if the TxID of ATSC 3.0 corresponding to time division hierarchical transmission is introduced as it is into a broadcasting system corresponding to frequency division hierarchical transmission such as ISDB-T or an advanced method, it may be difficult to estimate the transmission path characteristics with high accuracy.

Therefore, in the present technology, in the transmission device 11, a transmission identification signal indicating transmission identification information for identifying the transmission device 11 such as a TxID signal is injected not only into the OFDM symbol at the head constituting the frame of the OFDM signal but also into all the OFDM symbols (each OFDM symbol).

Then, the reception device 12 (in a case where there is a plurality of reception devices 12, all of the plurality of reception devices 12) estimates the transmission path characteristics using the correlation between the OFDM signal in which the transmission identification signal is injected into an arbitrary OFDM symbol and the predetermined transmission identification signal. Therefore, the reception performance of the reception device 12 can be improved. That is, in the reception device 12, the transmission path characteristics can be accurately estimated, and the OFDM signal can be appropriately equalized.

As defined in ATSC 3.0, a method of injecting a TxID signal only into a preamble symbol as an OFDM symbol at the head constituting the frame of the OFDM signal is also referred to as a TxID method. A method of injecting the transmission identification signal into all the OFDM symbols constituting the frame of the OFDM signal is also referred to as a full injection method.

<Full Injection Method>

Figure 19:
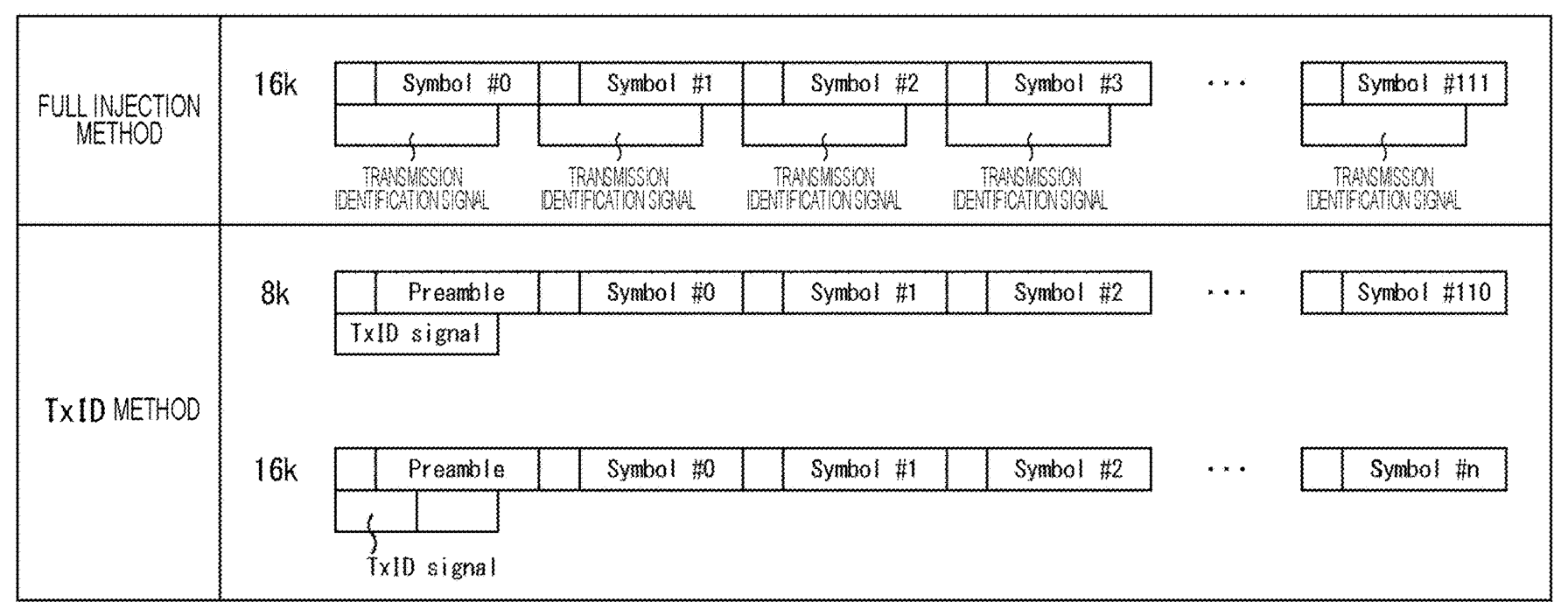

FIG. 19 is a diagram for explaining a full injection method.

In the full injection method, the transmission identification signal is injected into all the OFDM symbols constituting the frame of the OFDM signal.

On the other hand, in the TxID method, the TxID signal is injected only into the preamble symbol as the OFDM symbol at the head constituting the frame of the OFDM signal.

Note that, in the full injection method, for example, as described later, a $2^{14}-1$ bit (cycle) Gold sequence can be adopted as transmission identification information for identifying the transmission device.

For example, in a case where the FFT size is 16 k, only one transmission identification signal indicating $2^{14}-1$ bit transmission identification information can be injected into one OFDM symbol (Symbol) as illustrated in FIG. 19.

In the TxID method, the TxID is a $2^{13}-1$ bit Gold sequence, and only one TxID signal representing such a $2^{13}-1$ bit TxID can be injected into the preamble symbol (Preamble), which is the OFDM symbol at the head of the frame, for example, in a case where the FFT size is 8 k, as illustrated in FIG. 19.

Furthermore, for example, in a case where the FFT size is 16 k, only two TxID signals indicating $2^{13}-1$ bit TxID can be injected into the preamble symbol as illustrated in FIG. 19.

For example, in the advanced method, in a case where the FFT size is 16 k, 2592 us is scheduled as the effective symbol length Tu, and 112 OFDM symbols are scheduled as the number of OFDM symbols constituting the frame.

In a case where the TxID method is applied to the OFDM signal of the advanced method with the FFT size of 16 k, the estimation of the transmission path characteristics using the TxID signal can be performed only once in 2592 us. Therefore, in a case where the reception device is moving, the estimation accuracy of the transmission path characteristics is deteriorated.

In a case where the full injection method is applied to the OFDM signal of the advanced method with the FFT size of 16 k, the estimation of the transmission path characteristics using the transmission identification signal can be performed up to 112 times using the transmission identification signal injected into each of the 112 OFDM symbols. Therefore, according to the full injection method, since the transmission path characteristics can be estimated at a frequency 112 times higher than that of the TxID method, the transmission path characteristics can be estimated with high accuracy even in a case where the reception device is moving.

The full injection method can be applied to an OFDM signal in which a preamble symbol is arranged in a head portion of a frame, such as an OFDM signal of ATSC 3.0, and an OFDM signal in which a preamble symbol is not arranged in a head portion of a frame, such as an OFDM signal of ISDB-T or an advanced method.

Since the preamble symbol is robust due to a modulation method or the like, signal degradation due to interference caused by injection of a TxID signal or a transmission identification signal into the preamble symbol does not become a significant problem.

Meanwhile, the OFDM symbols corresponding to the data to be transmitted are not necessarily robust like the preamble symbol. Therefore, signal degradation due to interference caused by injection of the transmission identification signal into the OFDM symbols corresponding to the data to be transmitted becomes a problem. Therefore, the level (power) of the transmission identification signal injected into the OFDM symbols needs to be sufficiently low compared to the level of the OFDM symbols corresponding to the data to be transmitted.

FIG. 20 is a diagram illustrating a simulation result of signal degradation due to interference caused by injection of a transmission identification signal.

A carrier-to-noise ratio (CNR) that can demodulate the OFDM signal (necessary for demodulating the OFDM signal) is referred to as a required CNR.

FIG. 20 illustrates the degradation amount of the required CNR in a case where the transmission identification signal is injected with respect to the required CNR in a case where the transmission identification signal is not injected.

In FIG. 20, the horizontal axis represents a required CNR in a case where the transmission identification signal is not injected, and the vertical axis represents an injection level (IL) of the transmission identification signal injected into the OFDM signal.

The required CNR varies depending on a modulation method and a coding rate. For example, in so-called full-segment broadcasting using 12 segments of ISDB-T, a modulation method is 64QAM, and a coding rate is 3/4. In this case, a required CNR without injection of a transmission identification signal is about 19 dB.

In the simulation, the degradation amount of the required CNR in a case where the transmission identification signal is injected is calculated by changing IL from −45 dB to −21 dB.

From experience, it is not appropriate for the degradation amount of the required CNR to be 0.2 dB or more, and it is desirable that the degradation amount is about 0.1 dB or less.

Therefore, in the present technology, the transmission identification signal is injected with IL in which the degradation amount of the required CNR in a case where the transmission identification signal is injected is 0.1 dB or less as a threshold value, for example.

For example, as described above, in the full-segment broadcasting, the required CNR without injection of the transmission identification signal is about 19 dB. In FIG. 20, in a case where the required CNR without injecting the transmission identification signal is 20 dB that is the closest to 19 dB, it is necessary to set IL to −37 dB or less in order to set the degradation amount of the required CNR to 0.1 dB or less (0.09 dB).

Therefore, in a case where the full injection method is applied to the full-segment broadcasting, IL is set to, for example, −37 dB.

<Another Configuration Example of Transmission Device 11>

Figure 21:
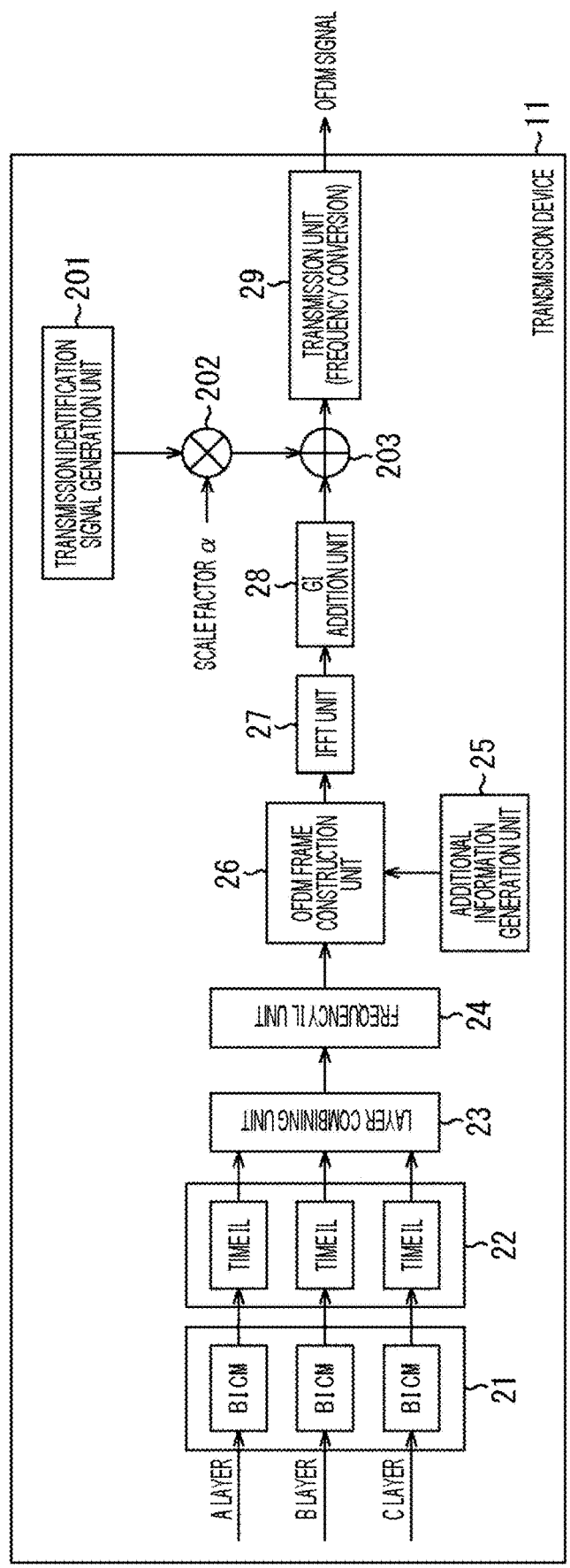
FIG. 21 is a block diagram illustrating another configuration example of the transmission device 11.

FIG. 21 is a block diagram illustrating another configuration example of the transmission device 11 in FIG. 1.

That is, FIG. 21 is a block diagram illustrating a configuration example of the transmission device 11 adopting the full injection method.

Note that, in the drawing, portions corresponding to those in the case of FIG. 2 are denoted by the same reference numerals, and the description thereof will be appropriately omitted below.

In FIG. 21, the transmission device 11 includes the BICM unit 21 to the transmission unit 29. Moreover, in FIG. 21, the transmission device 11 includes a transmission identification signal generation unit 201, a level adjustment unit 202, and an injection unit 203.

Therefore, the transmission device 11 of FIG. 21 is common to the case of FIG. 2 in including the BICM unit 21 to the transmission unit 29. However, the transmission device 11 of FIG. 21 is different from the case of FIG. 2 in that the transmission identification signal generation unit 201 to the injection unit 203 are newly provided.

The transmission identification signal generation unit 201 generates a transmission identification signal indicating transmission identification information for identifying the transmission device 11, and supplies the transmission identification signal to the level adjustment unit 202.

The level adjustment unit 202 adjusts the level (power) of the transmission identification signal from the transmission identification signal generation unit 201 according to the IL set in advance, and supplies the transmission identification signal after the level adjustment to the injection unit 203. The level adjustment is performed by multiplying the transmission identification signal by a scaling factor α corresponding to IL. The IL is set to a predetermined value, here, for example, 0.1 dB or less according to the degradation amount of the required CNR caused by the injection of the transmission identification signal into the OFDM signal as described with reference to FIG. 20. Therefore, in the reception device adopting the full injection method, the influence of the transmission identification signal injected into the OFDM signal on the demodulation of the OFDM signal can be suppressed to an allowable extent.

The injection unit 203 performs injection by adding the transmission identification signal from the transmission identification signal generation unit 201 to the OFDM signal from the GI addition unit 28, and supplies the OFDM signal after the injection of the transmission identification signal to the transmission unit 29.

The injection of the transmission identification signal into the OFDM signal by the injection unit 203 is performed for each OFDM symbol of the OFDM signal such that, for example, the head of the OFDM symbol coincides with the head of the transmission identification signal.

In the transmission device 11 configured as described above, the transmission identification signal generation unit 201 generates the transmission identification signal indicating the transmission identification information for identifying the transmission device 11, and supplies the transmission identification signal to the level adjustment unit 202. In the level adjustment unit 202, the level adjustment of the transmission identification signal from the transmission identification signal generation unit 201 is performed, and the transmission identification signal is supplied to the injection unit 203.

The injection unit 203 is supplied with the OFDM signal from the GI addition unit 28 in addition to the transmission identification signal from the level adjustment unit 202.

In the injection unit 203, the transmission identification signal from the transmission identification signal generation unit 201 is injected into each OFDM symbol of the OFDM signal from the GI addition unit 28, and is supplied to the transmission unit 29.

The transmission unit 29 performs frequency conversion on the OFDM signal from the injection unit 203 in which the transmission identification signal is injected into each OFDM symbol, and transmits the OFDM signal after the frequency conversion.

Figure 22:
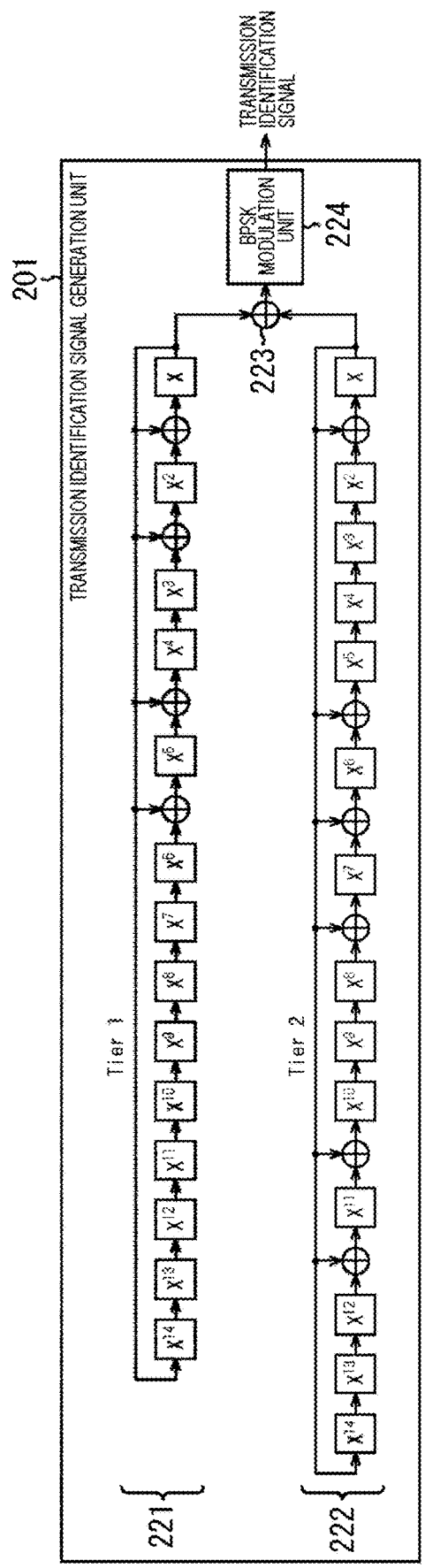
FIG. 22 is a block diagram illustrating a configuration example of a transmission identification signal generation unit 201.

FIG. 22 is a block diagram illustrating a configuration example of the transmission identification signal generation unit 201 in FIG. 21.

The transmission identification signal generation unit 201 includes a first-stage register group 221, a second-stage register group 222, a combining unit 223, and a BPSK modulation unit 224.

The first-stage register group 221 includes 14 registers $x^1$ to $x^{14}$ corresponding to the generator polynomial $x^{14}+x^5+x^4+x^2+x$, and four EXOR circuits. The first-stage register group 221 generates an M sequence of $2^{14}-1$ bits (cycle) according to the generator polynomial $x^{14}+x^5+x^4+x^2+x$, and supplies the M sequence to the combining unit 223.

The second-stage register group 222 includes 14 registers $x^1$ to $x^{14}$ corresponding to the generator polynomial $x^{14}+x^{11}+x^{10}+x^7+x^6+x^5+x$, and six EXOR circuits. The second-stage register group 222 generates a bit sequence according to the generator polynomial $x^{14}+x^{11}+x^{10}+x^7+x^6+x^5+x$, and supplies the bit sequence to the combining unit 223.

Here, the generator polynomial that generates a sequence in the first-stage register group 221 and the second-stage register group 222 is not limited to the generator polynomial described above.

The combining unit 223 combines the M sequence from the first-stage register group 221 and the sequence from the second-stage register group 222 in units of bits (takes exclusive OR) to generate a Gold sequence as transmission identification information of $2^{14}-1=16383$ bits, and supplies the Gold sequence to the BPSK modulation unit 224.

The BPSK modulation unit 224 performs BPSK modulation on the transmission identification information from the combining unit 223 to generate a transmission identification signal, and supplies the transmission identification signal to the level adjustment unit 202 (FIG. 21).

FIG. 23 is a diagram illustrating initial values set in the first-stage register group 221 and the second-stage register group 222.

In the registers $x^1$ to $x^{14}$ of the first-stage register group 221, bits indicated by Tier 1 in FIG. 23 are set as initial values.

In the registers $x^1$ to $x^{14}$ of the second-stage register group 222, bits t1 to t14 indicated by Tier 2 in FIG. 23 are set as initial values, respectively.

A 14 bit sequence of bits t1 to t14 is referred to as a transmission device address.

As the transmission device address, a unique value is assigned to each transmission device that adopts the full injection method.

In the second-stage register group 222, the bit sequence is generated with the 14 bit transmission device address unique to the transmission device as the initial value, so that the transmission identification information generated by the combining unit 123 of the transmission identification signal generation unit 201 (FIG. 22) is information that can identify $2^{14}=16384$ transmission devices.

The bit depth of the transmission device address can be set according to, for example, the total number NTx of the transmission devices 11 adopting the full injection method in a country adopting the full injection method.

For example, the bit depth of the transmission device address can be set to any integer value, for example, a minimum integer value among integer values equal to or greater than $\log_2$ NTx. In this case, a unique value can be assigned to all the transmission devices as the transmission device address.

For example, in Japan, in a case where all the transmission devices of ISDB-T adopt the full injection method, since the number of transmission devices (broadcasting stations) of ISDB-T is about 12000, by adopting a transmission device address of 14 bits or more, a unique value can be assigned as the transmission device address to each of the transmission devices of ISDB-T.

Note that the configurations of the generator polynomial that generates a sequence in the first-stage register group 221 and the second-stage register group 222, and the first-stage register group 221 and the second-stage register group 222 are different depending on the bit depth of the transmission device address.

Note that, in the full injection method, the transmission identification signal can be repeatedly injected within a range fitting in the OFDM symbol according to the lengths (time) of the OFDM symbol and the transmission identification signal.

In a case where the 14 bit transmission device address is adopted in the full injection method, the transmission identification information generated by setting the 14 bit transmission device address as the initial value in the second-stage register group 222 is a sequence of $2^{14}-1=16383$ bits (cycle).

In a case where the FFT size of the OFDM symbol is, for example, 16 k, only one 16383 bit transmission identification signal (representing transmission identification information) (one of 16383 bit transmission identification information) fits in the OFDM symbol.

Therefore, in the injection unit 203 (FIG. 21), in a case where the FFT size is 16 k, only one transmission identification signal of 16383 bits is injected into each OFDM symbol.

In a case where the FFT size of the OFDM symbol is, for example, 32 k, only two 16383 bit transmission identification signals fit in the OFDM symbol at the maximum.

Therefore, in a case where the FFT size is 32 k, the injection unit 203 can inject only two 16383 bit transmission identification signals to be repeatedly arranged in each OFDM symbol.

Note that, in the advanced method, an FFT size of 8 k is scheduled to be introduced, and an FFT size of 8 k is defined in Mode3 of ISDB-T. In a case where the FFT size is 8 k, the 16383 bit transmission identification signal does not fit in one OFDM symbol.

As described above, in a case where the transmission identification signal does not fit in one OFDM symbol, the injection unit 203 can inject one transmission identification signal over such a number of OFDM symbols in units of the number of OFDM symbols in which one transmission identification signal fits according to the lengths of the OFDM symbol and the transmission identification signal.

For example, in a case where the FFT size is 8 k, the injection unit 203 can repeat the injection of the 16383 bit transmission identification signal over two OFDM symbols in units of two OFDM symbols.

Even in a case where injection of one transmission identification signal over two OFDM symbols is repeated in units of two OFDM symbols, it can be said that the transmission identification signal is injected into all the OFDM symbols constituting the frame.

<Another Configuration Example of OFDM Demodulation Unit 31>

Figure 24:
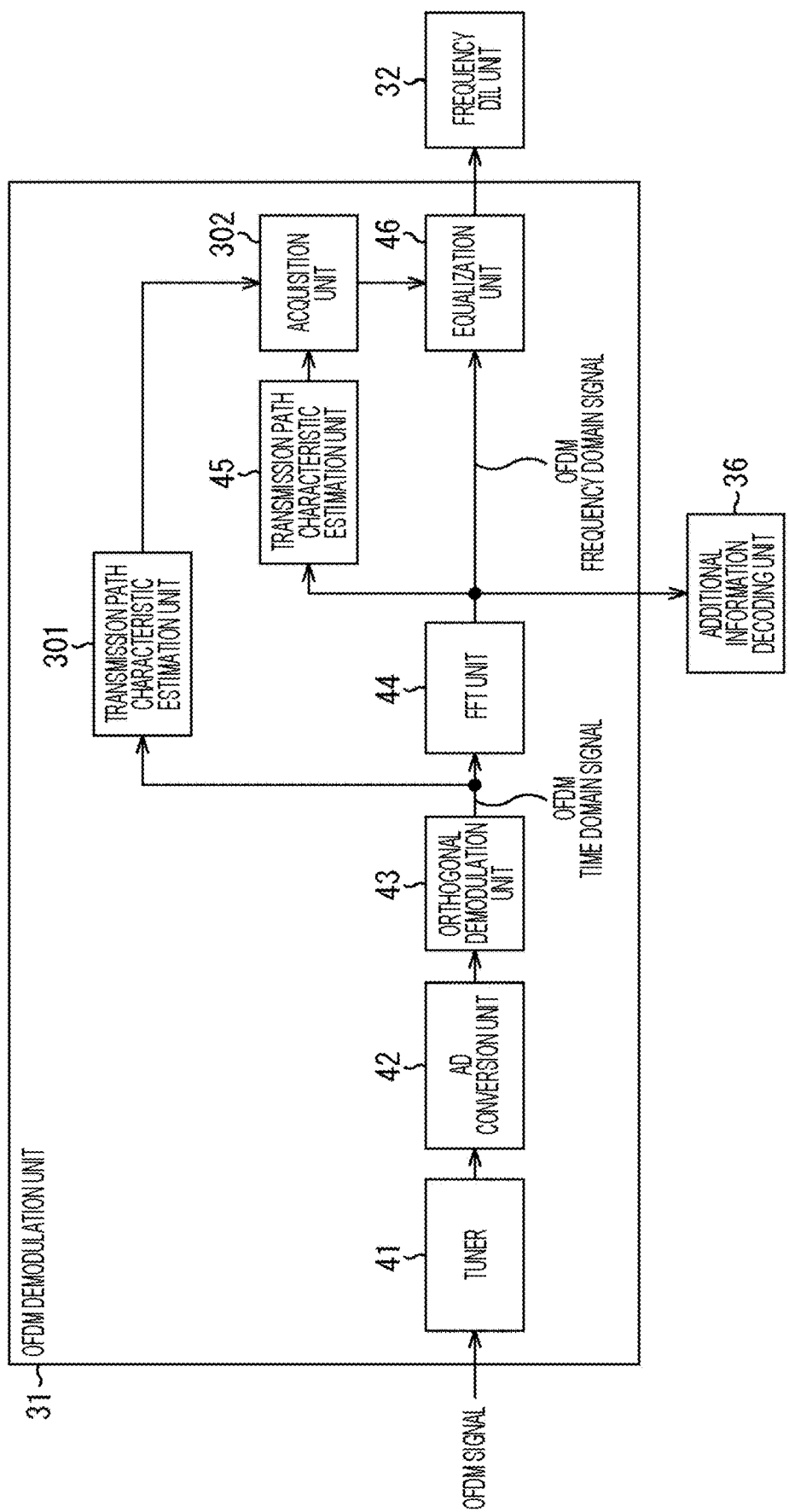
FIG. 24 is a block diagram illustrating another configuration example of the OFDM demodulation unit 31.

FIG. 24 is a block diagram illustrating another configuration example of the OFDM demodulation unit 31 in FIG. 3.

That is, FIG. 24 is a block diagram illustrating a configuration example of the OFDM demodulation unit 31 of the reception device 12 (FIG. 2) that adopts the full injection method.

Note that, in the drawing, portions corresponding to those in the case of FIG. 4 are denoted by the same reference numerals, and the description thereof will be appropriately omitted below.

In FIG. 24, the OFDM demodulation unit 31 includes the tuner 41 to the equalization unit 46. Moreover, in FIG. 31, the OFDM demodulation unit 31 includes a transmission path characteristic estimation unit 301 and an acquisition unit 302.

Therefore, the OFDM demodulation unit 31 in FIG. 24 is common to the case in FIG. 4 in including the tuner 41 to the equalization unit 46. However, the OFDM demodulation unit 31 in FIG. 24 is different from the case of FIG. 4 in that a transmission path characteristic estimation unit 301 and an acquisition unit 302 are newly provided.

An OFDM time domain signal is supplied from the orthogonal demodulation unit 43 to the transmission path characteristic estimation unit 301.

Here, in FIG. 24, the tuner 41 receives the OFDM signal from the transmission device adopting the full injection method, that is, the OFDM signal in which the transmission identification signal is injected into each OFDM symbol, like the transmission device 11 in FIG. 21. Therefore, the OFDM time domain signal supplied from the orthogonal demodulation unit 43 to the transmission path characteristic estimation unit 301 is an OFDM signal in which the transmission identification signal is injected into each OFDM symbol.

Using the OFDM time domain signal from the orthogonal demodulation unit 43, the transmission path characteristic estimation unit 301 estimates the transmission path characteristics according to the transmission identification signal injected into each OFDM symbol of the OFDM time domain signal, and supplies the transmission path characteristics to the acquisition unit 302.

Here, in the transmission path characteristic estimation unit 301, the transmission path characteristics estimated according to the transmission identification signal is also referred to as identification transmission path characteristics. Furthermore, in the transmission path characteristic estimation unit 45, the transmission path characteristics estimated using the pilot symbols are also referred to as pilot transmission path characteristics.

The acquisition unit 302 is supplied with the identification transmission path characteristics from the transmission path characteristic estimation unit 301 and is supplied with the pilot transmission path characteristics from the transmission path characteristic estimation unit 45.

The acquisition unit 302 uses the identification transmission path characteristics from the transmission path characteristic estimation unit 301 and the pilot transmission path characteristics from the transmission path characteristic estimation unit 45 to acquire transmission path characteristics (hereinafter, also referred to as equalization transmission path characteristics) used for equalization in the equalization unit 46, and supplies the transmission path characteristics to the equalization unit 46.

For example, the acquisition unit 302 can acquire the equalization transmission path characteristics by selecting one of the identification transmission path characteristics from the transmission path characteristic estimation unit 301 and the pilot transmission path characteristics from the transmission path characteristic estimation unit 45 as the equalization transmission path characteristics.

The acquisition unit 302 can select, for example, the identification transmission path characteristics or the pilot transmission path characteristics with a smaller error as the equalization transmission path characteristics. As the error between the identification transmission path characteristics and the pilot transmission path characteristics, for example, a difference between the pilot symbols in the OFDM signal after equalization using the identification transmission path characteristics and the pilot transmission path characteristics and the true values of the pilot symbols or the like can be adopted.

Furthermore, the acquisition unit 302 can select one of the identification transmission path characteristics and the pilot transmission path characteristics as the equalization transmission path characteristics, for example, according to the movement state of the reception device 12. For example, in a case where the reception device 12 is moving at a speed equal to or higher than a predetermined speed, the identification transmission path characteristics can be selected as the equalization transmission path characteristics. In a case where the reception device 12 does not move at a speed equal to or higher than the predetermined speed and can be regarded as (substantially) stationary, the pilot transmission path characteristics can be selected as the equalization transmission path characteristics.

In addition, for example, the acquisition unit 302 can acquire the pilot transmission path characteristics after processing as the equalization transmission path characteristics by processing the pilot transmission path characteristics according to the identification transmission path characteristics.

For example, the acquisition unit 302 can detect the folding paths included in the pilot transmission path characteristics by comparing the identification transmission path characteristics and the pilot transmission path characteristics. Then, in the acquisition unit 302, the pilot transmission path characteristics are filtered by a filter to perform processing of removing the folding paths, and the pilot transmission path characteristics after the processing can be acquired as the equalization transmission path characteristics.

Note that the equalization unit 46 can always use the identification transmission path characteristics as the equalization transmission path characteristics. In this case, the OFDM demodulation unit 31 can be configured without the transmission path characteristic estimation unit 45 and the acquisition unit 302.

Figure 25:
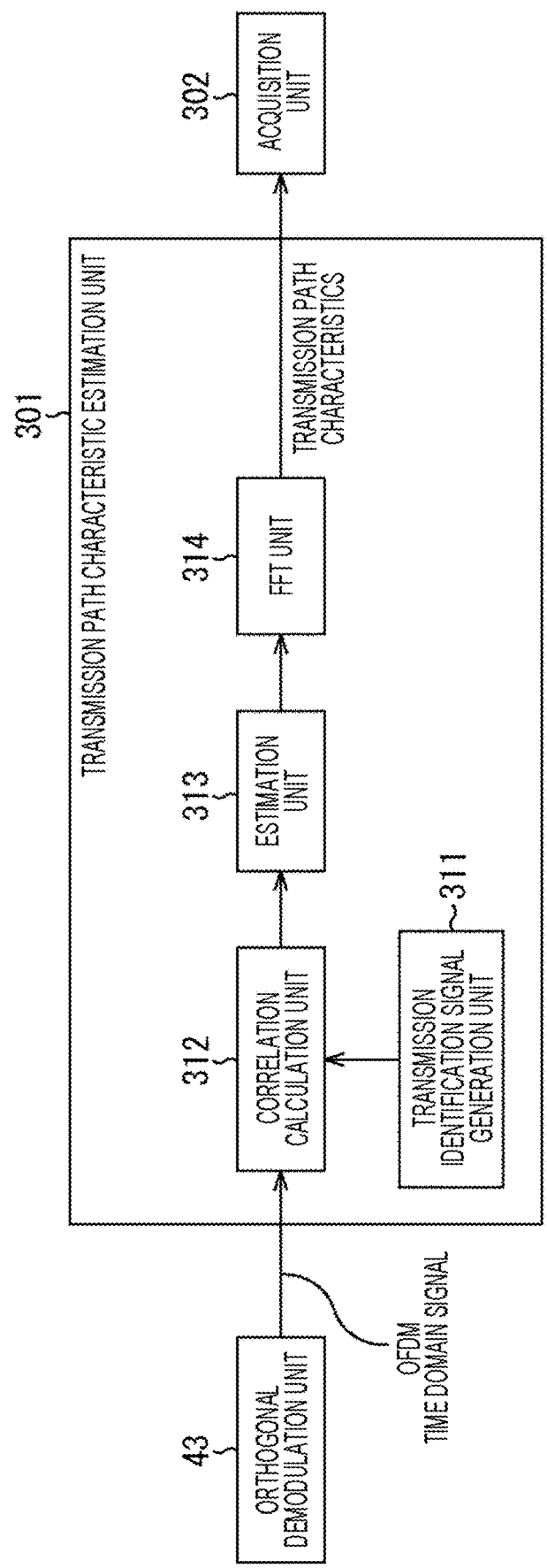
FIG. 25 is a block diagram illustrating a configuration example of a transmission path characteristic estimation unit 301.

FIG. 25 is a block diagram illustrating a configuration example of the transmission path characteristic estimation unit 301 in FIG. 24.

The transmission path characteristic estimation unit 301 includes a transmission identification signal generation unit 311, a correlation calculation unit 312, an estimation unit 313, and an FFT unit 314.

The transmission identification signal generation unit 311 is configured similarly to the transmission identification signal generation unit 201 in FIG. 22.

The transmission identification signal generation unit 311 sets all or some transmission device addresses of one or more transmission devices 11 constituting the transmission system in FIG. 1, for example, the transmission devices 11 constituting the transmission system in FIG. 1 as initial values of the second-stage register group 222, and generates a transmission identification signal for identifying each of the one or more transmission devices 11.

The transmission identification signal generation unit 311 supplies the transmission identification signal for identifying each of the (one or more) transmission devices 11 to the correlation calculation unit 312.

As the transmission devices 11 (hereinafter, also referred to as target transmission devices 11) for which the transmission identification signal is to be generated in the transmission identification signal generation unit 311, all of the transmission devices 11 constituting the transmission system in FIG. 1 can be set. Furthermore, as the target transmission devices 11, transmission devices 11 that transmit the OFDM signal that can be received by the reception device 12, for example, the transmission devices 11 within a range of a predetermined distance from the reception device 12 can be set.

The target transmission devices 11 can be appropriately set.

In a case where some of the transmission devices 11 constituting the transmission system in FIG. 1 are adopted as the target transmission devices 11, the load on the transmission path characteristic estimation unit 301 can be reduced as compared with a case where all the transmission devices 11 constituting the transmission system in FIG. 1 are adopted.

The correlation calculation unit 312 is supplied with the transmission identification signals of the target transmission devices 11 from the transmission identification signal generation unit 311, and is supplied with the OFDM time domain signal from the orthogonal demodulation unit 43.

Transmission identification signals of the transmission devices 11 that have transmitted OFDM signals as corresponding broadcast signals are injected into each OFDM symbol of the OFDM time domain signal supplied from the orthogonal demodulation unit 43 to the correlation calculation unit 312.

For each transmission identification signal of the target transmission devices 11 from the transmission identification signal generation unit 311, the correlation calculation unit 312 calculates a correlation between the transmission identification signal and the OFDM time domain signal from the orthogonal demodulation unit 43, for example, a sliding window correlation (SWC). The SWC is a correlation between the OFDM time domain signal in the window and the transmission identification signal of the target transmission device 11, which is calculated while shifting the window (function).

The correlation calculation unit 312 supplies the SWC calculated for each transmission identification signal of the target transmission devices 11 from the transmission identification signal generation unit 311 to the estimation unit 313.

The estimation unit 313 estimates the (identification) transmission path characteristics using the SWC for each transmission identification signal of the target transmission devices 11 from the correlation calculation unit 312.

For example, the estimation unit 313 estimates the transmission path characteristics between the target transmission device 11 and the reception device 12 by using the SWC for the transmission identification signals of the individual target transmission devices 11. Therefore, the estimation unit 313 can estimate the transmission path characteristics with the reception device 12 for each target transmission device 11.

The estimation unit 313 estimates the final transmission path characteristics on the basis of the transmission path characteristics (with the reception device 12) for each target transmission device 11.

For example, the estimation unit 313 estimates the final transmission path characteristics by combining all or part of the transmission path characteristics of each target transmission device 11.

In the final estimation of the transmission path characteristics, as the transmission path characteristics to be combined, for example, transmission path characteristics in which the level (power) of the path is equal to or greater than a threshold value, transmission path characteristics in which the level of the path is predicted to change to equal to or greater than the threshold value along with the movement of the reception device 12, or the like can be adopted.

In the OFDM time domain signal, since the transmission identification signal is injected into each OFDM symbol, the estimation unit 313 can estimate the transmission path characteristics at the frequency of the OFDM symbol. Therefore, even if the reception device 12 is moving, the transmission path characteristics can be estimated with high accuracy.

Furthermore, since the estimation unit 313 estimates the transmission path characteristics using the SWC, it is possible to estimate the transmission path characteristics with high accuracy without the influence of the folding paths.

The estimation unit 313 supplies the final transmission path characteristics to the FFT unit 314 as the identification transmission path characteristics.

The FFT unit 314 converts the identification transmission path characteristics from the estimation unit 313 from time domain information to frequency domain information by FFT, and supplies the information to the acquisition unit 302.

<Description of Computer to which Present Technology is Applied>

Next, the above-described series of processing can be performed by hardware or software. In a case where the series of processing is performed by software, a program constituting the software is installed in a general-purpose computer or the like.

Figure 26:
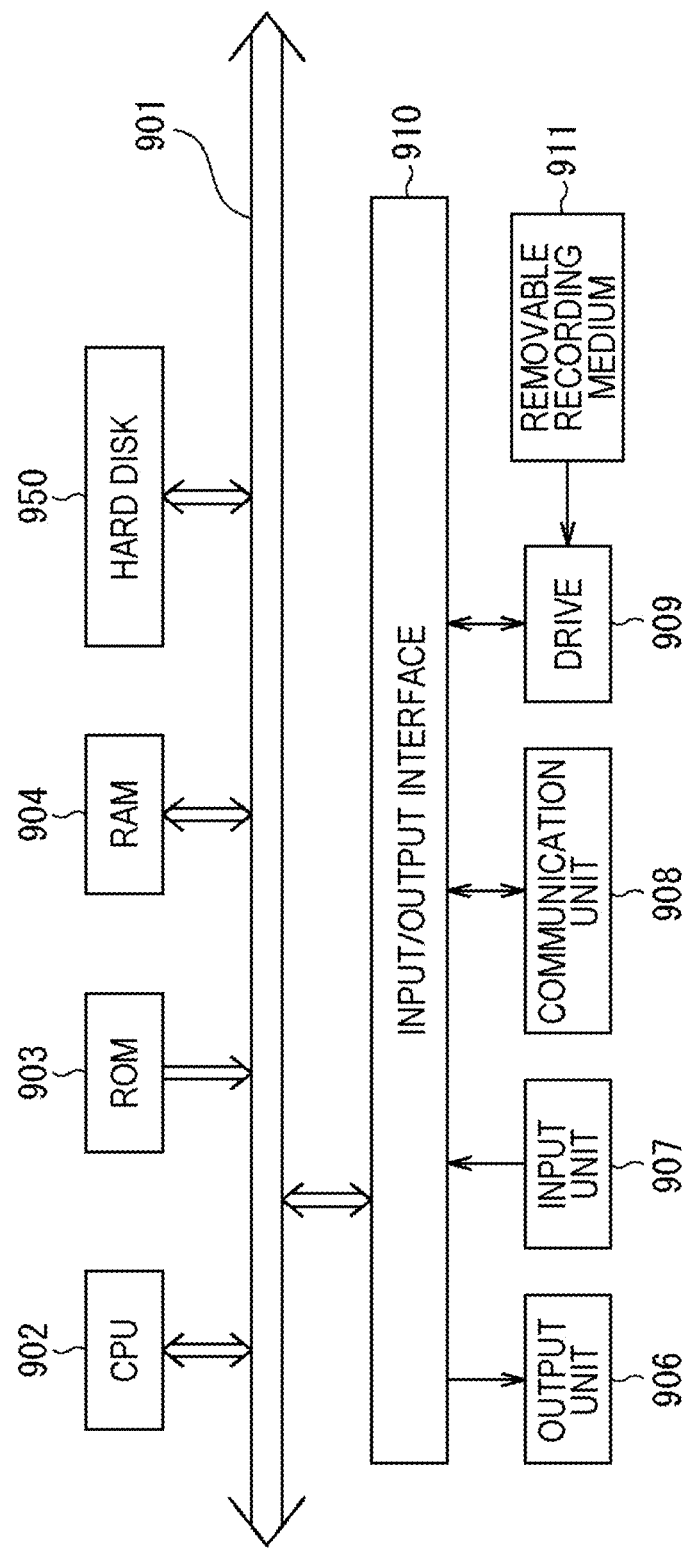
FIG. 26 is a block diagram illustrating a configuration example of an embodiment of a computer to which the present technology is applied.

FIG. 26 is a block diagram illustrating a configuration example of an embodiment of a computer in which a program for executing the above-described series of processing is installed.

The program can be recorded in advance in a hard disk 905 or a ROM 903 as a recording medium built in the computer.

Alternatively, the program can be stored (recorded) in a removable recording medium 911 driven by a drive 909. Such a removable recording medium 911 can be provided as so-called packaged software. Here, examples of the removable recording medium 911 include a flexible disk, a compact disc read only memory (CD-ROM), a magneto optical (MO) disk, a digital versatile disc (DVD), a magnetic disk, a semiconductor memory, and the like, for example.

Note that the program can be installed in the computer from the removable recording medium 911 as described above, or can be downloaded to the computer via a communication network or a broadcast network and installed in the built-in hard disk 905. That is, for example, the program can be wirelessly transferred from a download site to the computer via an artificial satellite for digital satellite broadcasting, or can be transferred by wire to the computer via a network such as a local area network (LAN) or the Internet.

The computer incorporates a central processing unit (CPU) 902, and an input/output interface 910 is connected to the CPU 902 via a bus 901.

When a command is input by a user operating an input unit 907 or the like via the input/output interface 910, the CPU 902 executes a program stored in a read only memory (ROM) 903 according to the command. Alternatively, the CPU 902 loads the program stored in the hard disk 905 into a random access memory (RAM) 904 and executes the program.

Therefore, the CPU 902 performs the processing according to the above-described flowcharts or the processing performed by the configuration of the above-described block diagrams. Then, the CPU 902 outputs the processing result from an output unit 906, transmits the processing result from a communication unit 908, or records the processing result in the hard disk 905 via the input/output interface 910, for example, as necessary.

Note that the input unit 907 includes a keyboard, a mouse, a microphone, and the like. Furthermore, the output unit 906 includes a liquid crystal display (LCD), a speaker, and the like.

Here, in the present specification, the processing performed by the computer according to the program is not necessarily performed in time series in the order described as the flowcharts. That is, the processing performed by the computer according to the program also includes processing executed in parallel or individually (for example, parallel processing or processing by objects).

Furthermore, the program may be processed by one computer (processor) or may be processed in a distributed manner by a plurality of computers. Moreover, the program may be transferred to a remote computer and executed.

Moreover, in the present specification, a system means a set of a plurality of components (devices, modules (parts), or the like), and it does not matter whether or not all the components are in the same housing. Therefore, a plurality of devices housed in separate housings and connected via a network and one device in which a plurality of modules is housed in one housing are both systems.

Note that the embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowcharts can be executed by one device or can be shared and executed by a plurality of devices.

Moreover, in a case where a plurality of processes is included in one step, the plurality of processes included in the one step can be executed by one device or can be shared and executed by a plurality of devices.

Furthermore, the effects described in the present specification are merely examples and are not limited, and other effects may be provided.

Note that the present technology can have the following configurations.

<1>
A transmission device including:
a transmission identification signal generation unit that generates a transmission identification signal indicating transmission identification information for identifying a transmission device that transmits an orthogonal frequency division multiplexing (OFDM) signal; and an injection unit that injects the transmission identification signal at a lower level than the OFDM signal corresponding to data to be transmitted into all OFDM symbols of the OFDM signal.

<2>

The transmission device according to <1>, in which the transmission device performs hierarchical transmission in which a transmission band is divided into layers in a frequency direction.

<3>

The transmission device according to <1> or <2>, in which the transmission identification information is a Gold sequence generated by using a transmission device address of a unique value for a transmission unit, and a bit depth of the transmission device address is set according to a total number of transmission devices that transmit the OFDM signal.

<4>

The transmission device according to <3>, in which the bit depth of the transmission device address is set to a minimum integer value equal to or greater than $\log_2 NTx$ according to a total number NTx of the transmission devices.

<5>

The transmission device according to <1> or <2>, in which the transmission identification information is a Gold sequence generated by using a transmission device address of a unique value for a transmission unit, and a bit depth of the transmission device address is 14 bits or more.

<6>

The transmission device according to any one of <1> to <5>, in which the injection unit injects the transmission identification signal at a level at which a degradation amount of a required carrier-to-noise ratio (CNR) necessary for demodulating the OFDM signal in a reception device that receives the OFDM signal in a case where the transmission identification signal is injected is equal to or less than a threshold value with respect to a case where the transmission identification signal is not injected.

<7>

The transmission device according to any one of <1> to <6>, in which the injection unit repeatedly injects the transmission identification signal within a range fitting in the OFDM symbol in accordance with lengths of the OFDM symbol and the transmission identification signal.

<8>

The transmission device according to any one of <1> to <6>, in which the injection unit injects the transmission identification signal over the number of OFDM symbols in which one of the transmission identification signal fits according to the lengths of the OFDM symbol and the transmission identification signal.

<9>

The transmission device according to any one of <1> to <8>, in which the OFDM signal is an OFDM signal in which a preamble symbol that is an OFDM symbol including transmission symbols of a preamble does not exist.

<10>

A transmission method including:

generating a transmission identification signal indicating transmission identification information for identifying a transmission device that transmits an orthogonal frequency division multiplexing (OFDM) signal; and injecting the transmission identification signal at a lower level than the OFDM signal corresponding to data to be transmitted into all OFDM symbols of the OFDM signal.

<11>

A reception device including a demodulation unit that demodulates an orthogonal frequency division multiplexing (OFDM) signal after injection of a transmission identification signal, the OFDM signal being obtained by:

generating the transmission identification signal indicating transmission identification information for identifying a transmission device that transmits the OFDM signal; and injecting the transmission identification signal at a lower level than the OFDM signal corresponding to data to be transmitted into all OFDM symbols of the OFDM signal.

<12>

The reception device according to <11>, in which the demodulation unit estimates a transmission path characteristic according to the transmission identification signal injected into an OFDM symbol of the OFDM signal using the OFDM signal.

<13>

The reception device according to <12>, in which the OFDM signal includes a pilot symbol that is a transmission symbol of a pilot signal, and the demodulation unit is configured to:

estimate a transmission path characteristic using the pilot symbol; and acquire an equalization transmission path characteristic that is a transmission path characteristic used for equalization of the OFDM signal by using an identification transmission path characteristic that is a transmission path characteristic estimated according to the transmission identification signal and a pilot transmission path characteristic that is a transmission path characteristic estimated using the pilot symbol.

<14>

The reception device according to <13>, in which the demodulation unit acquires the equalization transmission path characteristic by selecting one of the identification transmission path characteristic and the pilot transmission path characteristic as the equalization transmission path characteristic.

<15>

The reception device according to <14>, in which the demodulation unit selects one of the identification transmission path characteristic and the pilot transmission path characteristic having a smaller error as the equalization transmission path characteristic.

<16>

The reception device according to <14>, in which the demodulation unit selects one of the identification transmission path characteristic and the pilot transmission path characteristic as the equalization transmission path characteristic according to a movement state of the reception device.

<17>
The reception device according to <13>,
in which the demodulation unit processes the pilot transmission path characteristic according to the identification transmission path characteristic to acquire a pilot transmission path characteristic after processing as the equalization transmission path characteristic.

<18>
The reception device according to any one of <12> to <17>,
the demodulation unit is configured to:
generate the transmission identification signal of a target transmission device that is one or more transmission devices targeted for generation of the transmission identification signal;
calculate a correlation between the transmission identification signal and the OFDM signal for the target transmission device; and
estimate the transmission path characteristic of the target transmission device using the correlation.

<19>
The reception device according to <11>,
in which the OFDM signal is an OFDM signal in which a preamble symbol that is an OFDM symbol including transmission symbols of a preamble does not exist.

<20>
A reception method including
demodulating an orthogonal frequency division multiplexing (OFDM) signal after injection of a transmission identification signal, the OFDM signal being obtained by:
generating the transmission identification signal indicating transmission identification information for identifying a transmission device that transmits the OFDM signal; and
injecting the transmission identification signal at a lower level than the OFDM signal corresponding to data to be transmitted into all OFDM symbols of the OFDM signal.

REFERENCE SIGNS LIST

11 Transmission device
12 Reception device
13 Output device
21 BICM unit
22 Time IL unit
23 Layer combining unit
24 Frequency IL unit
Additional information generation unit
26 OFDM frame construction unit
27 IFFT unit
28 GI addition unit
29 Transmission unit
31 OFDM demodulation unit
32 Frequency DIL unit
33 Layer division unit
34 Time DIL unit
BICM unit
36 Additional information decoding unit
41 Tuner
42 AD conversion unit
43 Orthogonal demodulation unit
44 FFT unit
Transmission path characteristic estimation unit
46 Equalization unit
51 Pilot extraction unit
52 Time interpolation unit
53, 56 Frequency interpolation unit
57 Selection unit
61 0 interpolation unit
62 IFFT unit
63 Filter
64 FFT unit
111 Input formatting unit
112 BICM unit
113 Framing and interleaving unit
114 Waveform generation unit
115 TxID signal generation unit
116 Injection unit
117 Wireless interface
First-stage register group
122 Second-stage register group
123 Combining unit
124 BPSK modulation unit
125 Level adjustment unit
201 Transmission identification signal generation unit
202 Level adjustment unit
203 Injection unit
221 First-stage register group
222 Second-stage register group
223 Combining unit
224 BPSK modulation unit
301 Transmission path characteristic estimation unit
302 Acquisition unit
311 Transmission identification signal generation unit
312 Correlation calculation unit
313 Estimation unit
314 FFT unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. A transmission device comprising:
a transceiver; and
control circuitry that:
generates a transmission identification signal indicating transmission identification information for identifying a transmission device that transmits an orthogonal frequency division multiplexing (OFDM) signal; and
injects the transmission identification signal at a lower level than the OFDM signal corresponding to data to be transmitted into all OFDM symbols of the OFDM signal,
wherein the transmission identification information is a sequence generated by using a device-specific address of the transmission device,
wherein a bit depth of the device-specific address is set according to a total number of transmission devices that transmit the OFDM signal, and
wherein the bit depth of the device-specific address is set to a minimum integer value equal to or greater than log 2NTx, where NTx is equal to the total number of the transmission devices that transmit the OFDM signal.

2. The transmission device according to claim 1,
wherein the control circuitry controls the transceiver to perform a hierarchical transmission in which a transmission band is divided into layers in a frequency direction.

3. The transmission device according to claim 1,
wherein the bit depth of the device-specific address is 14 bits or more, and
wherein the sequence generated by using a device-specific address of the transmission device is a Gold sequence.

4. The transmission device according to claim 1,
wherein the control circuitry injects the transmission identification signal at a level at which a degradation amount of a required carrier-to-noise ratio (CNR) necessary for demodulating the OFDM signal in a reception device that receives the OFDM signal in a case where the transmission identification signal is injected is equal to or less than a threshold value with respect to a case where the transmission identification signal is not injected.

5. The transmission device according to claim 1,
wherein the control circuitry repeatedly injects the transmission identification signal within a range fitting in the OFDM symbol in accordance with lengths of the OFDM symbol and the transmission identification signal.

6. The transmission device according to claim 1,
wherein the control circuitry injects the transmission identification signal over a number of OFDM symbols in which one copy of the transmission identification signal fits according to the lengths of the OFDM symbol and the transmission identification signal.

7. The transmission device according to claim 1,
wherein the OFDM signal is an OFDM signal in which a preamble symbol does not exist.

8. A transmission method performed by a transmission device, the method comprising:
generating a transmission identification signal indicating transmission identification information for identifying a transmission device that transmits an orthogonal frequency division multiplexing (OFDM) signal; and
injecting the transmission identification signal at a lower level than the OFDM signal corresponding to data to be transmitted into all OFDM symbols of the OFDM signal,
wherein the transmission identification information is a sequence generated by using a device-specific address of the transmission device,
wherein a bit depth of the device-specific address is set according to a total number of transmission devices that transmit the OFDM signal, and
wherein the bit depth of the device-specific address is set to a minimum integer value equal to or greater than log 2NTx, where NTx is equal to the total number of the transmission devices that transmit the OFDM signal.

9. A reception device comprising:
a transceiver; and
a demodulator that demodulates an orthogonal frequency division multiplexing (OFDM) signal having a transmission identification signal injected into an OFDM symbol of the OFDM signal;
estimate a first transmission path characteristic according to the transmission identification signal,
wherein the OFDM signal includes a pilot symbol that is a transmission symbol of a pilot signal;
estimate a second transmission path characteristic using the pilot symbol; and
acquire an equalization transmission path characteristic that is a transmission path characteristic used for equalization of the OFDM signal, the equalization transmission path characteristic acquired by using the first transmission path characteristic and the second transmission path characteristic.

10. The reception device according to claim 9,
wherein the demodulator acquires the equalization transmission path characteristic by selecting one of the first transmission path characteristic or the second transmission path characteristic as the equalization transmission path characteristic.

11. The reception device according to claim 10,
wherein the demodulator selects one of the first transmission path characteristic or the second transmission path characteristic having a smaller error as the equalization transmission path characteristic.

12. The reception device according to claim 10,
wherein the demodulator selects one of the first transmission path characteristic or the second transmission path characteristic as the equalization transmission path characteristic according to a movement state of the reception device.

13. The reception device according to claim 9,
wherein the demodulator processes the second transmission path characteristic based on the first transmission path characteristic.

14. The reception device according to claim 9,
wherein the demodulation unit is configured to:
calculate a correlation between the transmission identification signal and the OFDM signal; and
estimate the first transmission path characteristic of the target transmission device using the correlation.

15. The reception device according to claim 9,
wherein the OFDM signal is an OFDM signal in which a preamble symbol does not exist.

16. A reception method performed by a reception device, the method comprising
demodulating an orthogonal frequency division multiplexing (OFDM) signal having a transmission identification signal injected into an OFDM symbol of the OFDM signal;
estimating a first transmission path characteristic according to the transmission identification signal,
wherein the OFDM signal includes a pilot symbol that is a transmission symbol of a pilot signal;
estimating a second transmission path characteristic using the pilot symbol; and
acquiring an equalization transmission path characteristic that is a transmission path characteristic used for equalization of the OFDM signal, the equalization transmission path characteristic acquired by using the first transmission path characteristic and the second transmission path characteristic.

* * * * *